(12) United States Patent
Jenkins

(10) Patent No.: US 12,536,144 B2
(45) Date of Patent: *Jan. 27, 2026

(54) IDENTITY RESOLUTION SYSTEM

(71) Applicant: Twilio Inc., San Francisco, CA (US)

(72) Inventor: Ray Jenkins, Austin, TX (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,302

(22) Filed: Jul. 18, 2024

(65) Prior Publication Data

US 2024/0370420 A1    Nov. 7, 2024

Related U.S. Application Data

(63) Continuation of application No. 17/664,028, filed on May 18, 2022, now Pat. No. 12,072,856.

(51) Int. Cl.
G06F 16/00 (2019.01)
G06F 16/215 (2019.01)
G06F 16/28 (2019.01)
G06Q 30/0201 (2023.01)

(52) U.S. Cl.
CPC ......... G06F 16/215 (2019.01); G06F 16/285 (2019.01); G06Q 30/0201 (2013.01)

(58) Field of Classification Search
None
See application file for complete search history.

(56) References Cited

U.S. PATENT DOCUMENTS

| | | | |
|---|---|---|---|
| 8,965,848 B2 | 2/2015 | Caceres | |
| 11,372,922 B1 * | 6/2022 | Laliberte | G06F 40/134 |
| 11,645,321 B2 | 5/2023 | Roller et al. | |
| 11,651,055 B2 * | 5/2023 | Saillet | G06N 5/025 382/159 |
| 2018/0176239 A1 | 6/2018 | Yan et al. | |
| 2019/0236057 A1 | 8/2019 | Ott et al. | |
| 2021/0352098 A1 * | 11/2021 | Rogers | G06F 16/252 |
| 2022/0100720 A1 | 3/2022 | Dhama et al. | |
| 2023/0376467 A1 | 11/2023 | Jenkins | |

FOREIGN PATENT DOCUMENTS

WO   WO-2017074457 A1   5/2017

OTHER PUBLICATIONS

Zhao et al. (CN-112581259-A), "Account Risk Identification Method And Device, Storage Medium And Electronic Device", Mar. 30, 2021, 23 Pages. (Year: 2021).*
"U.S. Appl. No. 17/664,028, Non Final Office Action mailed Oct. 26, 2023", 16 pgs.
"U.S. Appl. No. 17/664,028, Notice of Allowance mailed Apr. 18, 2024", 12 pgs.
"U.S. Appl. No. 17/664,028, Response filed Mar. 26, 2024 to Non Final Office Action mailed Oct. 26, 2023".

* cited by examiner

*Primary Examiner* — Bai D Vu
(74) *Attorney, Agent, or Firm* — Schwegman Lundberg & Woessner, P.A.

(57) ABSTRACT

A method of resolving an identity of an entity is disclosed. Entity data is ingested. Identity fragments observed in the entity data are recorded. All or a subset of identifiers that are connected across the identity fragments are discovered. A directed graph of the identity fragments is built. An entity profile is produced by applying a set of rules to the directed graph.

20 Claims, 24 Drawing Sheets

| EXTERNAL ID TYPE | MESSAGE LOCATION IN TRACK OR IDENTIFY CALL |
|---|---|
| user_id | userId |
| email | traits.email or context.traits.email |
| android.id | context.device.id when context.device.type = 'android' |
| android.idfa | context.device.advertisingId when context.device.type = 'android' AND context.device.adTrackingEnabled = true |
| android.push_token | context.device.token when context.device.type = 'android' |
| anonymous_id | anonymousId |
| braze_id | context.integrations.Braze.braze_id when Braze is connected as a destination |
| cross_domain_id | cross_domain_id when XID has been enabled for the workspace |
| ga_client_id | context.integrations ['Google Analytics'].clientId when explicitly captured by users |
| group_id | groupId |
| ios.id | context.device.id when context.device.type = 'ios' |
| ios.idfa | context.device.advertisingId when context.device.type = 'ios' AND context.device.adTrackingEnabled = true |
| ios.push_token | context.device.token when context.device.type = 'ios' |

| IDENTITY RESOLUTION CONFIGURATION ⊙ READ-ONLY | | | | | |
|---|---|---|---|---|---|
| PRIORITY | IDENTIFIER | SEEN | VALUE LIMIT | BLOCKED VALUES | IDENTIFIER TYPE |
| 1 | user_id | ● | 1 | — | DEFAULT |
| 2 | email | ● | 5 | — | DEFAULT |
| A↓Z | android.id | ● | 5 | — | DEFAULT |
| A↓Z | android.idfa | ● | 5 | — | DEFAULT |
| A↓Z | android.push_token | ● | 5 | — | DEFAULT |
| A↓Z | anonymous_id | ● | 5 | — | DEFAULT |
| A↓Z | ga_client_id | ● | 5 | — | DEFAULT |
| A↓Z | ios.id | ● | 5 | — | DEFAULT |
| A↓Z | ios.idfa | ● | 5 | — | DEFAULT |
| A↓Z | ios.push_token | ● | 5 | — | DEFAULT |

| EXTERNALID | LIMIT | PRIORITY |
|---|---|---|
| user_id | 1 | 1 |
| email | 5 | 2 |
| anonymous_id | 5 | 3 |

FIG. 8

```
{
    "Items": {
        {
            "Association__Left_Value": {
                "S": "ray@segment.com"
            },
            "Association__Left_Collection": {
                "S": "users"
            },
            "Association__Timestamp": {
                "S": "2020-03-31T11:01:23.920972232-05:00"
            },
            "Association__Right_Collection": {
                "S": "users"
            },
            "Association__Right_Key": {
                "S": "1\u0000users\u0000ios_id\u0000xy789555\u0000none"
            },
            "Association__Left_Type": {
                "S": "email"
            },
            "Association__SourceID": {
                "S": "1"
            },
            "Association__Right_Encoding": {
                "S": "none"
            },
            "Association__Right_Type": {
                "S": "ios_id"
            },
            "Association__Right_Value": {
                "S": "xy789555"
            },
            "PartitionKey": {
                "S": "1\u0000users\u0000email\u0000ray@segment.com\u0000none1\
                      u0000users\u0000ios_id\u0000xy789555\u0000none"
            },
            "Association__Left_Encoding": {
                "S": "none"
            },
            "Association__Left_Key": {
                "S": "1\u0000users\u0000email\u0000ray@segment.com\u0000none"
            }
        }
    },
}
```

BASE EXAMPLE

```
1   {
2     vectorKey=hash(sourceId, [identifier1, indentifier2, ...]): {
3       identifier1: {
4         "TS": 1234567890,
5         "SourceId": sourceId,
6         "Idx": (workspaceId, identifier1)
7       },
8       identifier2: <...>
9     }
.0  }
```

GSI SPEC

```
1   {
2     "TableName": "CrucibleObservations",
3     "IndexName": "IdentifierIndex",
4     "KeySchema": [
5       {
6         "AttributeName": "Idx",
7         "KeyType": "HASH"
8       },
9       {
.0        "AttributeName": "SourceId",
.1        "KeyType": "RANGE"
.2      }
.3    ]
.4  }
```

GSI QUERY

```
1   {
2     "TableName": "CrucibleObservations",
3     "IndexName": "IdentifierIndex",
4     "KeyConditionExpression": "Idx = :v_idx AND SourceId IN (:v_src0, :v_src1)",
5     "ExpressionAttributeValues": {
6       "v_idx": (workspaceId, identifier),
7       "v_src0": source1,
8       "v_src1": source2
9     }
.0  }
```

| PRIORITY | IDENTIFIER | LIMIT | TIME |
|---|---|---|---|
| 1 | USER_ID | 1 | EVER |
| 2 | EMAIL | 1 | EVER |

1800

```
    type ProfileApi interface {
        ...
        GetExternalIdsWithRules (id ExtId, rules [ ] IDResRule) [ ] ExtId
    }
    type IDResRule struct {
        Collection        string           'json: "collection" '
        Type              string           'json: "id_type" '
        Limit             int              'json: "merged_limit" '
        Order             ResRuleOrder     'json: "order" '
        SourcePrecedence  [ ] string       'json: "source_precedence" '
```

```
    }
    type ResRuleOrder int
    const (
        EARLIEST ResRuleOrder = iota
        LATEST
    )
```

```
GetExternalIdsWithRules (ExtId {Type: "email", Value: "ray@segment.com",
   [ ] IDResRule {
      {
         Collection: "users",
         Type:       "user_id",
         Limit:      2,
      },
   }
)
result = [ ] ExtId { {Type: "email", ID: "ray@segment.com", {Type: "user_id",
ID: "rjenkins"}, {Type: "user_id", ID: "rayjenkins"}
```

```
GetExternalIdsWithRules (ExtId {Type: "email", Value: "ray@segment.com",
   [ ] IDResRule {
      {
         Collection: "users",
         Type:       "user_id",
         Limit:      1,
         Order:      EARLIEST
      },
   }
)
result = [ ] ExtId { {Type: "email", ID: "ray@segment.com", {Type: "user_id",
ID: "rjenkins"}
```

```
GetExternalIdsWithRules (ExtId {Type: "email", Value:
"ray@segment.com",
    [ ] IDResRule {
        {
            Collection: "users",
            Type:      "user_id",
            Limit:     1,
            SourcePrecedence: [2, 1]
        },
    }
)
result = [ ] ExtId { { Type: "email", ID: "ray@segment.com", {Type:
"user_id",
ID: "rayjenkins"}
```

FIG. 20

BuildDiGraph
DEPTH FIRST SEARCH STARTING AT AN EXTERNAL ID

{"email": "ray@segment.com"}

RETURN FLATTENED DIRECTED GRAPH OF EXTERNAL
ID ASSOCIATIONS BY TIME

```
results := og.BuildDigraph ( ExtID{
    SourceID:   "1",
    Collection: "users",
    Type:       "email",
    Value:      "ray@segment.com",
    Encoding:   "none",
})
```

```
{
 0:
    Key: 2020-03-31 11:01:23.900972232
    Value: {
        0: ExtID {
            SourceId:   "1",
            Collection: "users",
            Type:       "email",
            Value:      "ray@segment.com"
        },
        1: ExtId {
            SourceId:   "1",
            Collection: "users",
            Type:       "ios_id",
            Value:      "xy789555"
        },
    },
 1:
    Key: 2020-03-31 11:01:24.900972232
    Value: {
        0: ExtId {
            SourceId:   "1",
            Collection: "users",
            Type:       "user_id",
            Value:      "rjenkins"
        },
    }
}
```

```
type GraphFilter func (id ExtId) bool type ProfileApi interface {

GetExternalIdsWithFilter (id ExtId , filter GraphFilter) [ ] ExtId

GetExternalIdsWithRules (id ExtId , rules [ ] IDResRule) [ ] ExtId
}
```

| EXPLORER | COMPUTED TRAITS | AUDIENCES | DESTINATIONS | SETTINGS |

YOUR COMPUTED TRAITS

🔍 SEARCH COMPUTED TRAITS BY NAME...        [NEW COMPUTED TRAIT]

USER COMPUTED TRAITS                                           SORT BY ▽

| COMPUTED TRAIT NAME | TYPE | STATUS | USERS WITH TRAIT | DESTINATIONS |
|---|---|---|---|---|
| 👤 CLICKED-TRAIT | EVENT COUNTER | ● LIVE | 2 | NO DESTINATIONS |

FIG. 24

COMPUTED TRAITS / CLICKED-TRAIT

| | OVERVIEW | BUILDER | SETTINGS |
|---|---|---|---|

CLICKED-TRAIT
CREATED BY SLOTH 32 MINUTES AGO

| COMPUTED TRAIT DETAILS | STATUS | TYPE | DOWNLOAD |
|---|---|---|---|
| 0 CONNECTED DESTINATIONS | ● LIVE | EVENT COUNTER | CSV FILE |

DESTINATIONS
THIS TRAIT IS SYNCED TO 0 DESTINATIONS

ADD DESTINATIONS

THIS TRAIT WON'T SYNC UNTIL YOU ADD DESTINATIONS TO IT.
CLICK THE BUTTON BELOW TO ADD DESTINATIONS TO THIS TRAIT.

ADD DESTINATIONS

| COMPUTED TRAIT EXPLORER | SEARCH BY EMAIL, USERID... | SEARCH |
|---|---|---|
| NAME | EMAIL | EVENT COUNTER |
| (RJ) RAY JENKINS | ray@segment.com | 1 |
| (U) USER | | 1 |

FIG. 25

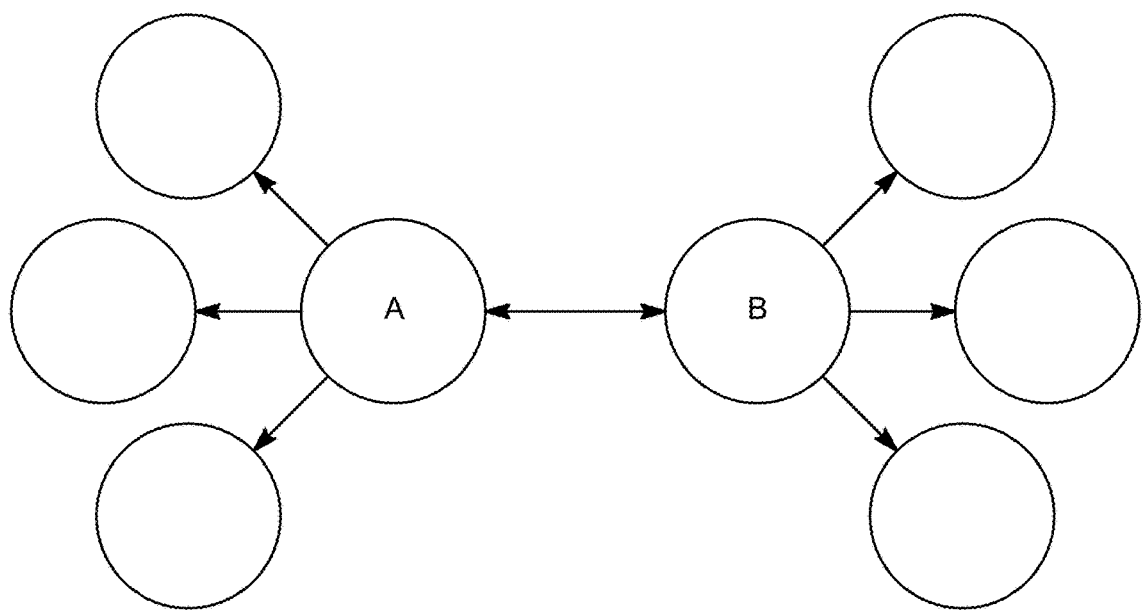
FIG. 26
FIG. 27

IDENTITY RESOLUTION SYSTEM

CLAIM OF PRIORITY

This Application is a continuation of U.S. application Ser. No. 17/664,028, filed May 18, 2022, which is hereby incorporated by reference in its entirety.

TECHNICAL FIELD

The subject matter disclosed herein generally relates to methods, systems, and machine-readable storage media for techniques for resolving identities of entities associated with of one or more computer systems and, in one specific examples, to techniques for modeling relationships between discrete identify fragments received or collected from one or more data sources (e.g., for use in building of entity profiles)

BACKGROUND

A large swath of the Internet's retailers or marketers depend on data platforms, such as Segment, to collect, clean and control their entity data, such as customer data. Such data platforms may consume entity data from a set of different sources, each of which may provide different types of entity data. Finding connections between these different types of entity data is called identity resolution. A goal of identity resolution may be to assemble a holistic view of an entity and all of the interactions that entity has with a particular brand (e.g., in an omni-channel environment).

BRIEF DESCRIPTION OF THE DRAWINGS

Various of the appended drawings merely illustrate example embodiments of the present disclosure and cannot be considered as limiting its scope.

FIG. 5 is an example table in which example identifier types are mapped to example locations in messages.

FIG. 7 depicts Example Merge Protection Rules.

FIG. 8 depicts examples of limits and priority interacting on user_id and email.

FIG. 13 depicts a DynamoDB Adjacency Example.

FIG. 14 depicts a sketch of a DynamoDB Identity Fragment Fingerprint Model.

FIG. 18 depicts an example API for getting external IDs with rules.

FIGS. 19-20 depict results of calling the API of FIG. 16.

FIG. 21 depicts an example of a depth-first search starting at an external ID.

FIG. 22 depicts an example of an API for executing custom functions.

FIG. 24 depicts an example user interface including a Computed Trait as a top level concept.

FIG. 25 depicts an example user interface including a Computed Trait Detail View and Matching Users.

FIG. 26 depicts an example user interface including a Computed Trait Viewed on a Customer Profile.

FIG. 27 depicts an example graph for which the identity resolution system determines to remove an observation between ExternalIDs A and B.

DETAILED DESCRIPTION

Figure 1:
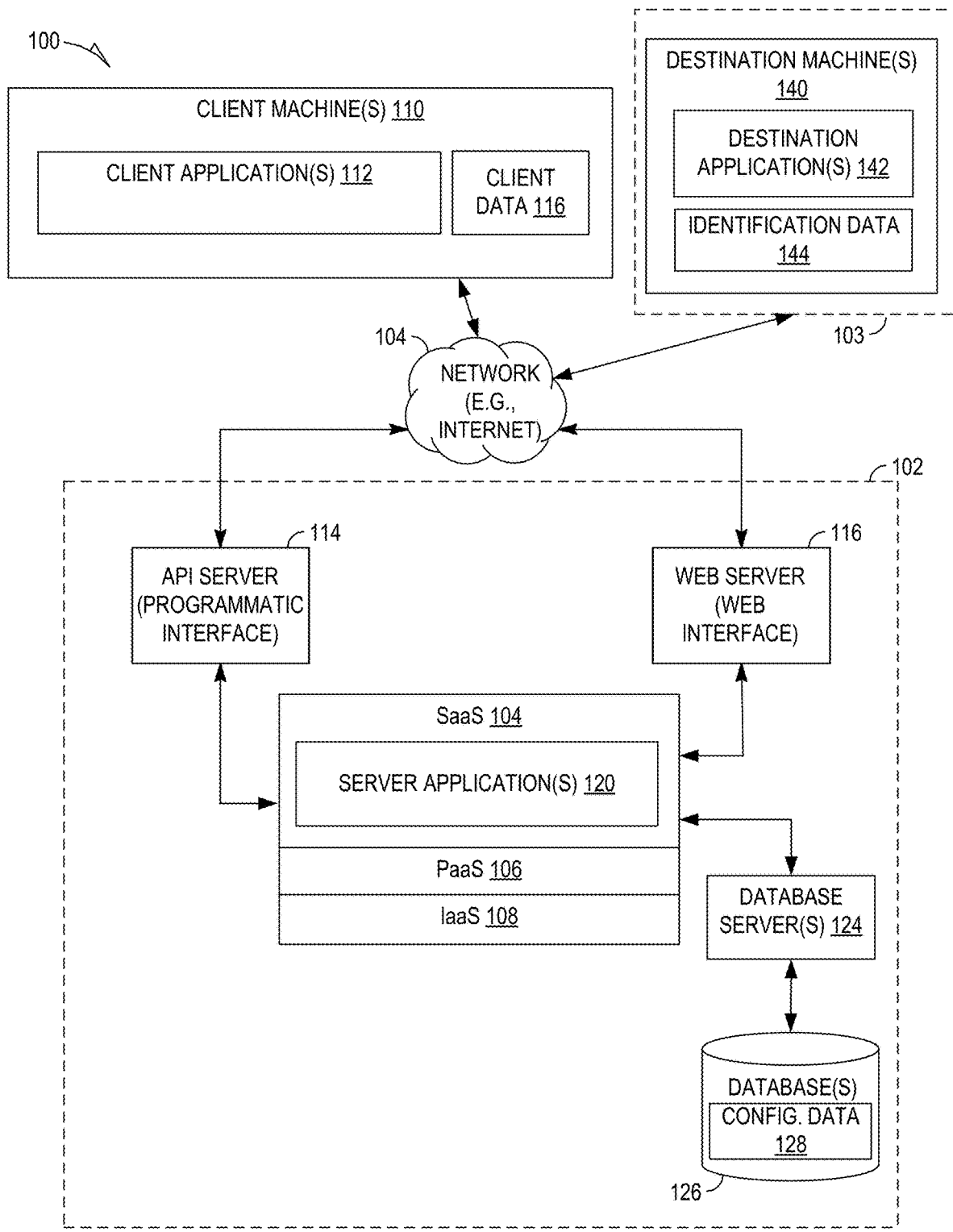
FIG. 1 is a network diagram depicting a cloud-based SaaS system within which various example embodiments may be deployed.

Example methods, systems, and computer programs are directed to an identity resolution system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An entity is something that exists apart from other things, having its own independent existence. An identity is the distinguishing attributes or characteristics of an entity that makes it unique. An example of an entity is a unique user of an application executing on a client device or a server device.

In example embodiments, each of the attributes or characteristics of an identity may be represented as an identifier (also referred to herein as a profile identifier, unique identifier, or ExternalID).

In example embodiments, an ExternalID includes a Type field and an ID field. A value of the ID field may identify the actual identifier and a value of the Type field may identify a type of the identifier. For example, the value of the Type field may include a pre-defined textual identifier specifying a type of a message channel (e.g., "email") to which the value of the ID field corresponds and the value of the ID field corresponding to this Type field may include an email address (e.g., "ray2021@emailaddress.com"). Or the value of the Type field may include a pre-defined indicator (e.g., "anonymousId") that specifies that the type of the identifier is an anonymous identifier and the ID field corresponding to this Type filed may include the actual anonymous identifier (e.g., "j93ux8qq1jhqfkcbyzafe").

In example embodiments, streams of client data (or entity data) (e.g., data pertaining to a customer of a business and/or data pertaining to a user of a website, application, or server) may be consumed from one or more sources, such as one or more websites, applications, or servers that are configured to track the entity's behavior. For example, a source may include a web site to which one or more code snippets have been added to load analytics, identify users, and/or track actions of the users.

In example embodiments, as streams of data are consumed from different Sources, identifiers or groups of identifiers (e.g., identity fragments) may be uncovered. Different sources may provide different types of identifiers.

A method of resolving an identity of an entity is disclosed. Identity fragments observed in the entity data are recorded. All or a subset of identifiers that are connected across the identity fragments are discovered. A directed graph of the identity fragments is built. An entity profile is produced by applying a set of rules to the directed graph.

FIG. 1 is a network diagram depicting an example system 100 within which various example embodiments may be deployed. One or more client machine(s) 110 may be communicatively coupled (e.g., via one or more network(s) 104) to one or more networked systems, such as networked system 102 or networked system 103. Each of the one or more client machine(s) 110 may execute on or more client application(s) 112. Examples of client application(s) 112 include one or more applications that receive, store, and/or transmit identity information (e.g., information pertaining to identities of one or more users of the one or more client application(s) 112), as discussed in more detail below. In example embodiments, the client application(s) may allocate or deallocate memory for client data 116 corresponding to events detected on the device, processing resources for processing or analyzing the data pertaining to the events, and communication resources (e.g., bandwidth) for receiving or transmitting the client data. In example embodiments, the client data include identity information. Other examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Each of the client application(s) 112 may include one or more software application modules (e.g., a plug-in, add-in, or macro) that adds a specific service or feature to the application.

One or more of networked systems 102 or 103 may take the example form of a cloud computing service, such as Amazon Web Services (AWS), Microsoft Azure, or other cloud service and may provide server-side functionality, via a network 104 (e.g., the Internet or Wide Area Network (WAN)) to one or more endpoints (e.g., client machines 110). FIG. 1 illustrates client application(s) 112 on the client machines 110. In example embodiments, networked system 103 includes one or more destination machine(s) 140. The one or more destination machine(s) 140 may executed one or more destination application(s) 142 that are configured to, for example, receive and analyze event data received from the one or more client machine(s) 110 and/or communicate results of the analysis to the one or more client application(s) 112 or the one or more server application(s) 120. In example embodiments, the one or more destination machine(s) 140 operate on filtered event data that is received from the client application(s) 114, which may include filtered identification data 144, as described in more detail below. Examples of the destination application(s) 142 may include a customer data platform or analytics system, such as Segment, Amplitude, Mixpanel, Google Analytics, and so on.

In example embodiments, the networked system 102 includes one or more server application(s) 120 that are configured to, for example, receive communications from the one or more client application(s) 112 or the one or more destination application(s) 142. In example embodiments, communications received from the one or more client application(s) 112 may include information useful for identifying types of devices of the one or more client machine(s), such as operating systems deployed on the one or more client machine(s), features supported by the one or more client machine(s), computing resources available to the one or more client machine(s), or information pertaining to the identifies of the one or more users of the client machine(s) 110. Communications may also include information pertaining to detection of events on the client machine(s) 110, including some or all of a set of event data and/or the identification data 144. This information may then be processed and used by the server application(s) 120 to, for example, create, update, or remove data items stored in configuration data 128, including profile data pertaining to identities of the one or more users of the client machine(s) 110, as described in more detail herein. In example embodiments, the configuration data may include rules included in one or more plug-ins that are installed on the one or more client machine(s) 110 (e.g., for filtering, merging, and/or unmerging of identity information (from which the identification data 144 may be generated), such as identity information included in the client data 116, before sending of the identification data 144 to the destination machine(s) 140, as described in more detail herein).

Communications received from the destination application(s) 142 may include information included in the client data 116 from which one or more profiles (e.g., user profiles, entity profiles, or customer profiles) may be processed or generated. This processing may include merging profiles or unmerging profiles based on connections identified in the client data 116 from which the identification data 144 may be generated, such as, for example, through discoveries of one or more connections between one or more fragments of client data 116 received from one or more of the client machine(s) 110, as described herein.

The one or more server application(s) may perform one or more operations to, for example, configure the one or more client application(s) 112 or the one or more destination application(s) 142. For example, the one or more server application(s) may select one or more plug-ins (e.g., from configuration data 128) for deployment on the one or more client machine(s) 112 (e.g., based on the identified types of the one or more client machine(s) 110). In example embodiments, the one or more server application(s) 110 may customize instructions included in the plug-ins based on the one or more communications received from the client machine(s) 110 or the destination machine(s) 140 (e.g., based on information pertaining to the efficiency with which data or events are being processed on the client machines, based on the types of output that the one or more server applications desire to receive from the destination applications 142), and/or based on one or more rules related to identity data, such as rules governing the merging or unmerging of profiles from which the identification data 144 is generated, merge protection rules, graph processing rules, or identity resolution rules, as described herein.

Each of networked systems 102 or 103 may include an Application Programming Interface (API) server (e.g., API server 114) or a web server (e.g., web server 116), which may be coupled to, and provide programmatic and web interfaces respectively to, one or more software services, which may be hosted on a software-as-a-service (SaaS) layer or platform (e.g., SaaS platform 104). The SaaS platform may be part of a service-oriented architecture, being stacked upon a platform-as-a-service (PaaS) layer (e.g., PaaS layer 106) which, may be, in turn, stacked upon a infrastructure-as-a-service (IaaS) layer (e.g., IaaS layer 108) (e.g., in accordance with standards defined by the National Institute of Standards and Technology (NIST)).

While the server applications 120 are shown in FIG. 1 to form part of the networked system 102, in alternative embodiments, the server applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs.

One or more of the client applications 112 executing on the client machine(s) 110 may access the various server applications 120 or destination applications 142 (e.g., via an interface supported by a server, such as web server, or an API supported by an API server, such as API server 114). For example, third-party applications executing on the client machine(s) 110 may access one or more features or functions on a website hosted by the third party, such as those provided by destination application(s) 142 or server application(s) 120 using interfaces or APIs.

The server applications 120 or destination applications 142 may be hosted on dedicated or shared server machines (not shown) that are communicatively coupled to enable communications between server machines. The server applications 120 or destination application(s) 142 themselves may be communicatively coupled (e.g., via appropriate interfaces) to each other and to various data sources, so as to allow information to be passed between the server applications 120 and destination application(s) 142 and so as to allow the server applications 120 and destination application(s) 142 to share and access common data. The server applications 120 or destination application(s) 142 may furthermore access one or more databases (e.g., database(s) 126) via one or more database servers (e.g., database server(s) 124). In various example embodiments, various data items are stored in the database(s), such as configuration data 128 or identification data 144.

Figure 2:
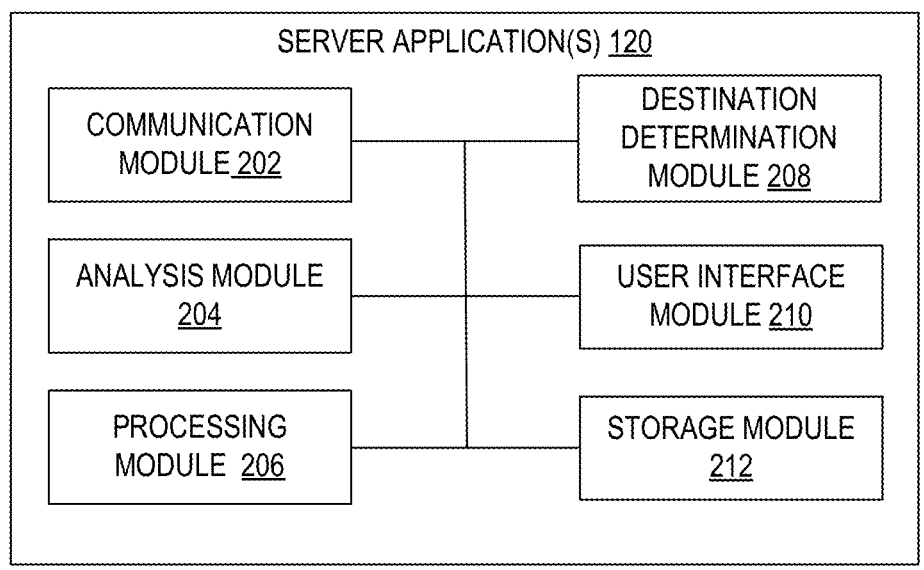
FIG. 2 is a block diagram illustrating example modules of the server applications of FIG. 1.

FIG. 2 is a block diagram illustrating example modules of the server applications 120. A communication module 202 may be configured to receive data from one or more sources (e.g., the client machine(s) 110 or the destination machine(s) 140) and/or send data to one or more destinations (e.g., client machine(s) 110 or the destination machine(s) 140). For example, the communication module 202 may be configured to receive or ingest the client data 116 from the client machine(s) 110 and/or send identification data 144 to the destination machine(s) 140).

An analysis module 204 may be configured to analyze data received from the one or more sources. For example, the analysis module 204 may be configured to identify fragments of identification information included in the client data 116 from the client machine(s) 110. The analysis module 204 may be configured to one or more connections between the identity fragments, as described herein.

A processing module 206 may be configured to determine how to process the identification information based on the one or more identified connections. For example, the processing module 206 may be configured to merge identify fragments into a single profile corresponding to a user and/or the processing module 206 may be configured to unmerge identity fragments that were previously combined into a single profile, as described herein.

A destination determination module 208 may be configured to identity one or more destinations to which to send the identification data 144. In example embodiments, the identification data 144 includes information corresponding to one or more profiles of the one or more users that were generated or modified by the processing module 206.

A user interface module 210 may be configured to generate one or more user interfaces, such as administration user interfaces for configuring the server application(s) 120, as described herein.

A storage module 212 may be configured to store profile data corresponding to one or more users. In example embodiments, the profile data may include one or more combinations of identity fragments received in the client data 116 from the one or more client machine(s) and stored as a profile. In example embodiments, the profile data may include metadata identifying one or more connections between one or more identity fragments from which the profile data may be generated.

Figure 3:
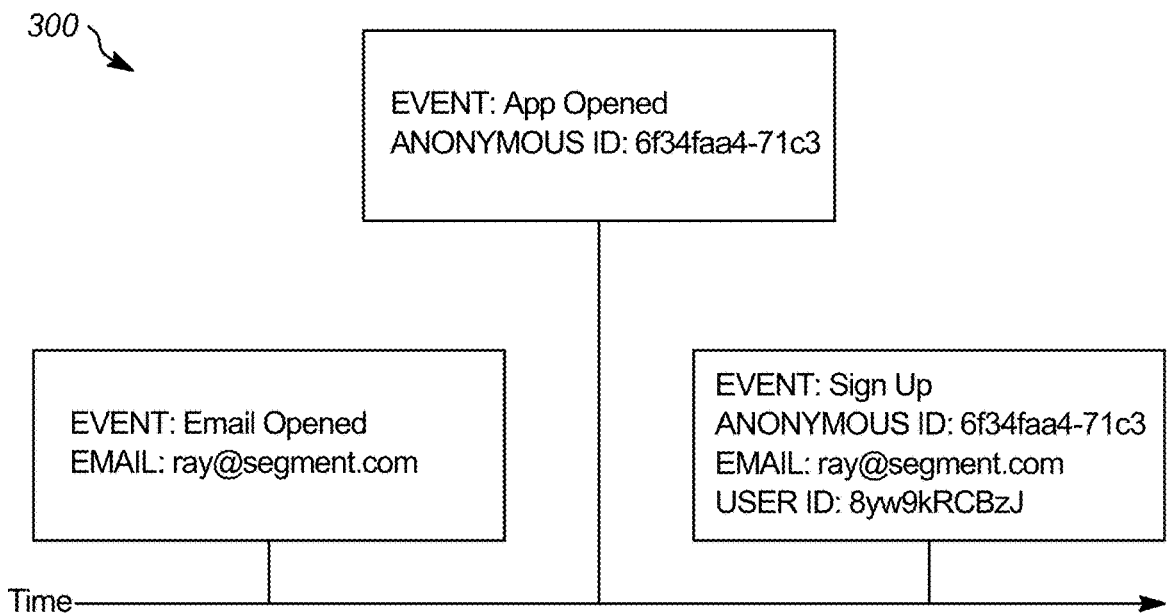
FIG. 3 is a flow chart depicting events received from one or more sources corresponding to a journey of a customer over time.

FIG. 3 is a flow chart depicting events received from one or more sources corresponding to a journey of a customer over time.

1. A user receives an email from a company about an online sale from one of their favorite stores. The user has never purchased from the retailer online, but the user has shared an email address when making an in-store purchase. When the user opens the email, a pixel event is sent (e.g., to an identify resolution system) with the users's email address and an event of "Email Opened".

2. The user then visits an App Store and installs the retailer's mobile app. Once the user launches the app a track event is sent with an Anonymous ID and an Event of "App Opened".

3. The user then decides to make a purchase; in order to do so, the user uses a Sign Up option on the mobile app and provides an email address. A User ID is created for the user and the mobile application sends an event with the user's Email, Anonymous ID, and User ID and an Event of "Sign Up".

In example embodiment, the identify resolution system processes such discrete identity fragments from one or more sources and finds connections between them. In example embodiments, the identity resolution system models such discrete pieces of data with a memory construct, such as a graph.

Figure 4:
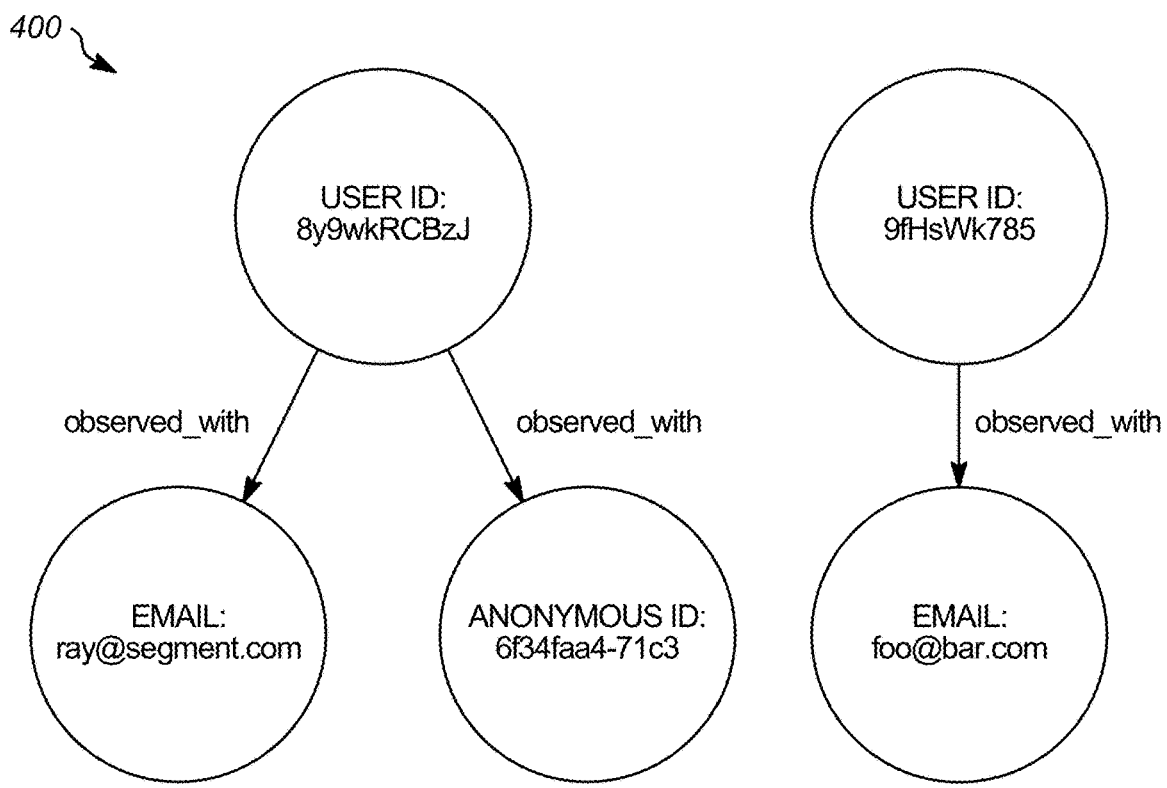
FIG. 4 is an example of a graph that models the relationships between discrete pieces of data depicted in FIG. 1.
Figure 6A:
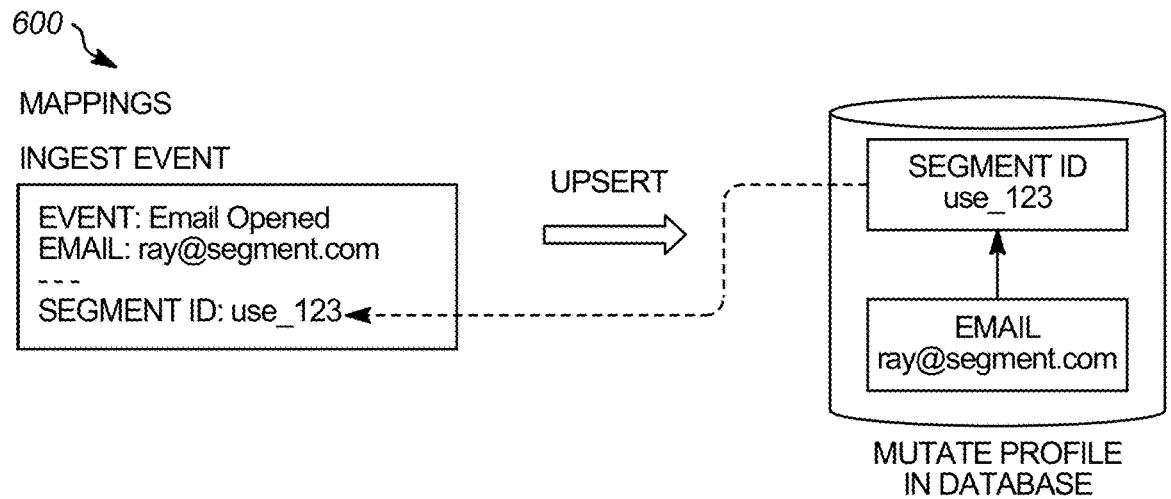
FIGS. 6A-6C depict detected identity fragments leading to creation of a first profile and a second profile and a merging of the first profile and the second profile.
Figure 6B:
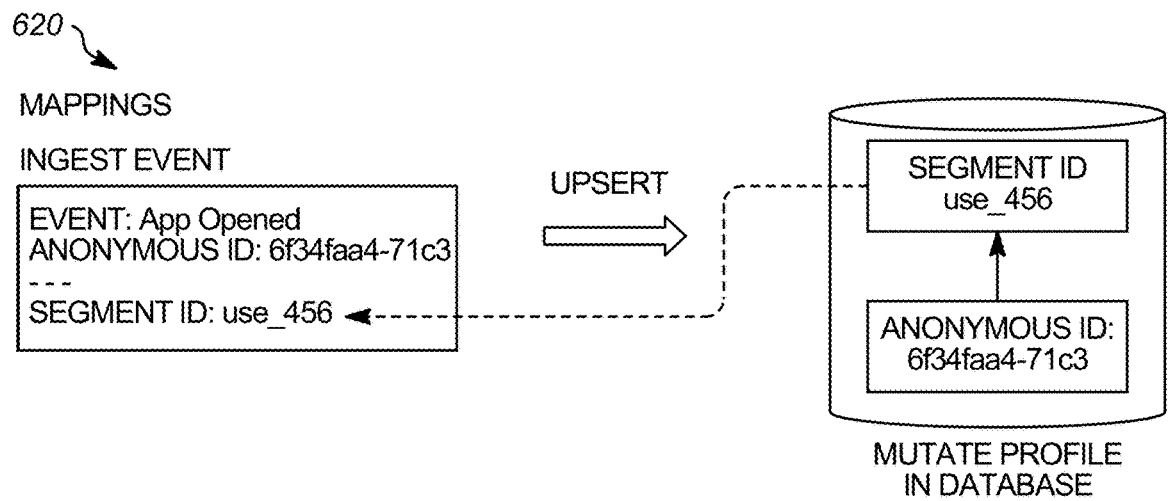
Figure 6C:
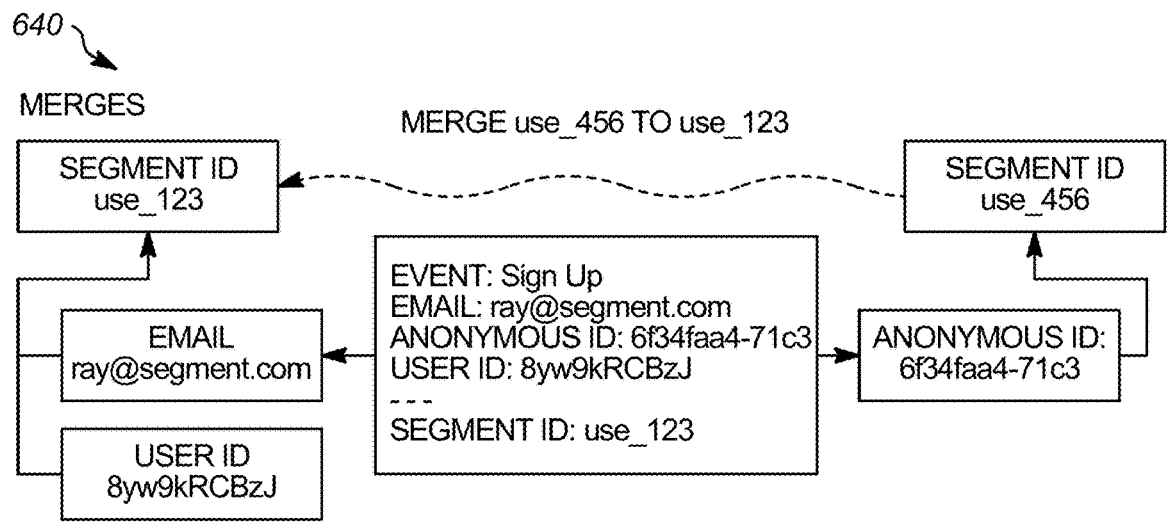

FIG. 4 is an example of a graph that models the relationships between discrete pieces of data depicted in FIG. 1. In example embodiments, the graph includes two types of objects—vertices (or nodes) and edges (or connections, associations, or relationships). In example embodiments, identifiers are extracted from the identity fragments. In example embodiments, the event types may be excluded. The graph includes an indication of a connection between the identifiers when they are observed together. Here, the graph includes two subgraphs, showing a lack of connection between two different sets of the data received from the one or more sources. Here, each of the subgraphs represents a unique entity based on the lack of the path between them. In example embodiments, each set of connected identifiers are used as natural keys to identify the corresponding entity.

In example embodiments, different types of messages may be found in different locations of communications received from the one or more sources. In example embodiments, a table may be stored in a memory in which mappings of types of messages to their locations may be determined.

FIG. 5 is an example table in which example identifier types are mapped to example locations in messages, such as event messages, that are received by the identity resolution system from one or more sources.

Example Identity Resolution System #1

In example embodiments, a first identity resolution system may accomplish identity resolution using a technique called "Flat Matching Logic". When a message is processed by the identity resolution system, it inspects all the ExternalIDs on the messages and checks a database to see if it has previously seen any of these ExternalIDs before. Depending on what is found, one of following three things can occur.

Case One: Create New Profile; When there are no pre-existing profiles that have matching identifiers to the event, the identity resolution system creates a new user profile.

Case Two: Add Event to Existing Profile; When there is only one profile that matches all identifiers in an event, the identity resolution system attempts to map the traits, identifiers and events on the call to that existing profile. If there is an excess of any identifier on the final profile, the identity resolution system defers to one more merge protection rules, described below.

Case Three: Merge Existing Profiles; When there are multiple profiles that match the identifiers in an event, the identity resolution system attempts to merge profiles (e.g., using a set of "Merge Protection Rules," described below).

As described above, ExternalIDs can be thought of as natural keys and a set of connected ExternalIDs can be used to uniquely identify an entity, such as a user. While this is true, there is at least one wrinkle to consider: the Identity Graph of a unique entity may be built from one or more different data sources over time. Therefore, the underlying set of natural keys that define an entity may be subject to change as more data is uncovered.

In order to accommodate the inherent instability of the set of natural keys that identify an entity, the identity resolution system may generate a universally unique identifier (UUID) key for each entity profile. This UUID is a Surrogate Key and is internally referred to as a "SegmentID". The ExternalIDs are then said to be mapped to a SegmentID, thus introducing, one level of indirection. When a profile is created or updated, the SegmentID and ExternalIDs are stored in the database and indexes are created to allow lookup in either direction.

The use of SegmentIDs covers Case One (Create New Profile) and Case Two (Add Event to Existing Profile). However (e.g., due to processing over time), a third case arises. This case is Merging Existing Profiles.

In the example case discussed above, the identity resolution system has first learned about the user via the Email Opened event. This is the first time the identity resolution system has seen this ExternalID, so it creates a new Customer Profile. This creation of an initial profile is depicted in FIG. 4A.

Later the identity resolution system learns an anonymous user has just opened up the mobile app for the first time. At this point, there is nothing connecting these two ExternalIDs, so the identity resolution system creates a second profile. This creation of a second profile is depicted in FIG. 4B.

Finally, when the user signs up, the identity resolution system is able to associate or "merge" these two profiles. A new merge record is created in the database, which associates these two profiles. This merging of the two profiles is depicted in FIG. 4C.

As can be seen, the number of profiles and merges by the identity resolution system is dependent on the order in which events are processed. As an example, assume there were just two events here: Anonymous ID on App Opened and Sign Up. If Sign Up was processed first, there would be no need for a merge. FIG. 5 depicts Example Merge Protection Rules.

The identity resolution system additionally allows for the creation of rules, which have an impact on how profiles are created, updated, or merged.

Merge protection rules may have Blocked Values, Value Limits, and/or a Priority. Value Limits may additionally have a time window. Blocked Values may specify values that are blocked.

The following is an example of how Value Limits and Priorities may impact Identity Resolution and Profile Creation.

Assume a profile already exists with user_id abc123 and email jane@example1.com.

A new event comes in with new user_id abc456, but the same email jane@example1.com. If the identity resolution system mapped this event to the existing profile, the resulting profile would then contain two user_ids and one email. Given that user_id has a limit of 1, the limit of for this identifier has been exceed. In this case, the identity resolution system may check the priority of these identifiers. Because email and user_id are the only two identifiers on the event, and email is ranked lower than user_id, the identity resolution system may demote email as an identifier on the incoming event and try again.

At this point, the identity resolution system may search for any profiles that match just the identifier user_id abc456. Now there are no existing profiles with this identifier, so a new profile may be created with user_id abc456.

FIG. 8 depicts examples of limits and priority interacting on user_id and email.

Identify and Group calls allow for traits to be included with an event. Traits are free form pieces of additional data about a known or anonymous user. The identity resolution system may associate these traits with an entity during the identity resolution process. Traits differ from external identifiers in that they are not distinguishing attributes of unique Identity. For, a name is not a unique identifier; many people may share the name "Peter Gibbons".

```
{
"userId": "019mr8mf4r", "traits": {
"name": "Peter Gibbons", "industry": "Technology"
},
"context": {
"ip": "24.5.68.47"
},
"timestamp": "2012-12-02T00:30:08.276Z"
}
```

In example embodiments, the identity resolution system sits at the front of an identity resolution pipeline. After an identity has been resolved, new messages are produced that contain the original message, the surrogate key which uniquely identifies a Customer Profile (SegmentID), and any merge information, if necessary.

```
type IdentifiedMessage struct {
  Message v2.Message <- original message (contains External IDs)
  ...
  SegmentId v2. SegmentID <-- surrogate key for profile
  // MergedFrom is a list of segment IDs that were merged to this
message's segmentID
  // if this message caused an identity merge to occur.
  MergedFrom [ ]v2. SegmentID
  ...
  // MergedbyExternalIDs is a map of ExternalIDs that caused a merge
to this message's segment ID, indexed by the SegmentId it merged from
  MergedByExternalIDs map[string][ ]v2.ExternalID
}
```

FIG. 7 depicts an example identity resolution pipeline. Systems downstream from the identity resolution system depend on an identity being added to the messages they process. They then subsequently index data by SegmentID. The pipeline includes:
   BigTable: Indexes Events, Metadata, Traits, ExternalIDs, Links by SegmentID.
   BigQuery: Copies of ExternalID, Links, Traits and Merges indexed by SegmentID
   Flink: Stateful computations need copies of ExternalIDs, Traits, and Merges by SegmentID.

Replicating identity information downstream has pros and cons. These systems are now aware of an identity and changes to identity (new ExternalIDs, traits, merges) and they needn't go back to the identity resolution system to lookup entity data on every computation. Sometimes data in these downstream systems may diverge slightly and it may become difficult to interpret which system is the source of truth. When things are working as expected, this is not a problem, however, if the identity graph becomes corrupted, this corruption of data may be replicated to many systems.

Example identity resolution system #1 has a powerful identity resolution system with various pros and cons. The coupling of data ingestion, Identity Fragment storage, Identity Resolution has several consequences including:
   Side effects of the identity resolution algorithm used by the identity resolution system are persisted to the database. The identity resolution algorithm is applied to input messages and the output is saved to the identity store. In other words, the algorithm persists its side effects. Any unexpected behavior or ill effects are permanent. Ill effects can include data loss, erroneous profiles created, bad merges, permanent addition of incorrect or unwanted identifiers, or other corruption to entity profiles. In most cases the only way to correct the system for the entity is to begin again from scratch and replay all of the entity's data. Replaying is a lengthy and costly processes, during which time the entity is unable to derive any benefits from identity resolution.
   The output of the Identity Resolution algorithm is dependent on event processing order. Running the same data through the identity resolution system will result in a different number of profiles and merges being created due to lack of ordering. This non-determinism makes it difficult to reason about the system and verify its correctness.
   Rules must be applied at ingestion time and rule changes have no effect on prior observations. Rules application is coupled to event ingestion and the results of what is read from the database at time of ingestion. Rule changes cannot be retroactively applied to prior observations to modify profiles. As such, there may be no infrastructure in place or capability to recompute identity on a batch or ad hoc basis, for an individual profile. However, a positive feature of applying Merge Protections Rules at ingest time is limiting potentially explosive tree depth growth on misbehaving sources.
   Modifications to Identity Resolution algorithms require data migration Significant changes to how the Identity Resolution algorithm works may require migrating data. This is risky for both the customer and developers.
   Identity Resolution algorithms may be closed to the user. With the exception of Merge Protection rules, the identity resolution algorithm may be closed to the customer.
   Specific data model and read only API. Online identity is a constantly evolving concept and a flexible identity resolution system would allow for creating objects of various types, performing transformations, and interconnecting them in unpredictable ways. Example identity resolution system #1 is somewhat tightly typed to support ExternalIDs, SegmentIDs, Mappings (ExternalID to SegmentID) and Merges (SegmentIDs to SegmentIDs). Its API may provide read access to the results of the algorithms, which is coupled to data ingestion. Other systems may not be able use the identity resolution APIs of example identity resolution system #! to arbitrarily create, modify, or delete new arbitrary objects or identifiers and associate them in arbitrary ways to build new entity profiles.
   Identity is unversioned and singular. While it's true that entities may want a single source of truth for an entity profile, they may want to able to experiment with changes to the identity resolution algorithm. If rules and computation logic changes to identity were versioned, users may be able to rollback to previous safe versions when errors occur. Additionally, some end-users of entity profiles generated by the identity resolution system may be large enterprises or conglomerates operating multiple business units. These users may wish to build and provide subtly or vastly different versions of an entity profile to different business units.
   Downstream systems further calcify Identity. Downstream systems depend on identity being appended to messages. The data model for Events, Metadata, and Traits are all stored downstream from the Identity Resolution system. Identities may be merged in downstream systems, but may not be unmerged or mutated in a way to alter previous observations.

Example Identity Resolution System #2

Example identity resolution system #2 builds upon example identity resolution system #1. Example identity resolution #2 decouples data ingestion, identity resolution, and customer profile computation. This design offers some improvements, including the following:
   Robustness: De-risks and reduces the impact of algorithm changes, unwanted side effects of misconfiguration, or ingestion of data that can corrupt the Identity Graph. Much of this robustness is achieved though decoupling.
   Decoupling: By storing results at different stages of the Identity Resolution pipeline, example identity resolution system #2 not only reduces risk, but also allows for greater parallelism of engineering efforts. Decoupling will allow different teams to simultaneously work on subsystems of the Identity resolution platform. For example, storage and query performance optimizations can be done in parallel with other teams working on profile computation.
   Performance and Scalability: Improves write and read path performance and overall system latency. Builds a system, that in theory, will be infinitely scalable.

Flexibility: Allows for more generic OLAP or analytics style processing to enable users to gain better insights from their data. The system should react to changes safely and allow for stream and batch computation models.

Openness: Allows customers greater control over Identity Resolution algorithms and the potential ability to write their own processing algorithms.

While the identity resolution system should be configurable to ingest unbounded data, the identity resolution algorithm does not necessarily need to be tightly coupled to ingest. In example embodiment, the identity resolution system is able to recompute Customer Profiles based on previous observations.

In example embodiments, the Identity Resolution algorithm can be modeled as a function.

$f(G(V,E)) \rightarrow$ Customer Profile

Where, G(V,E) is a graph of ExternalIDs and their adjacencies ordered by time.

By storing adjacencies of ExternalIDs we can discover G(V,E) or the subgraph of Identifiers for an Entity, for any given External ID, using a depth-first search.

Figure 9:
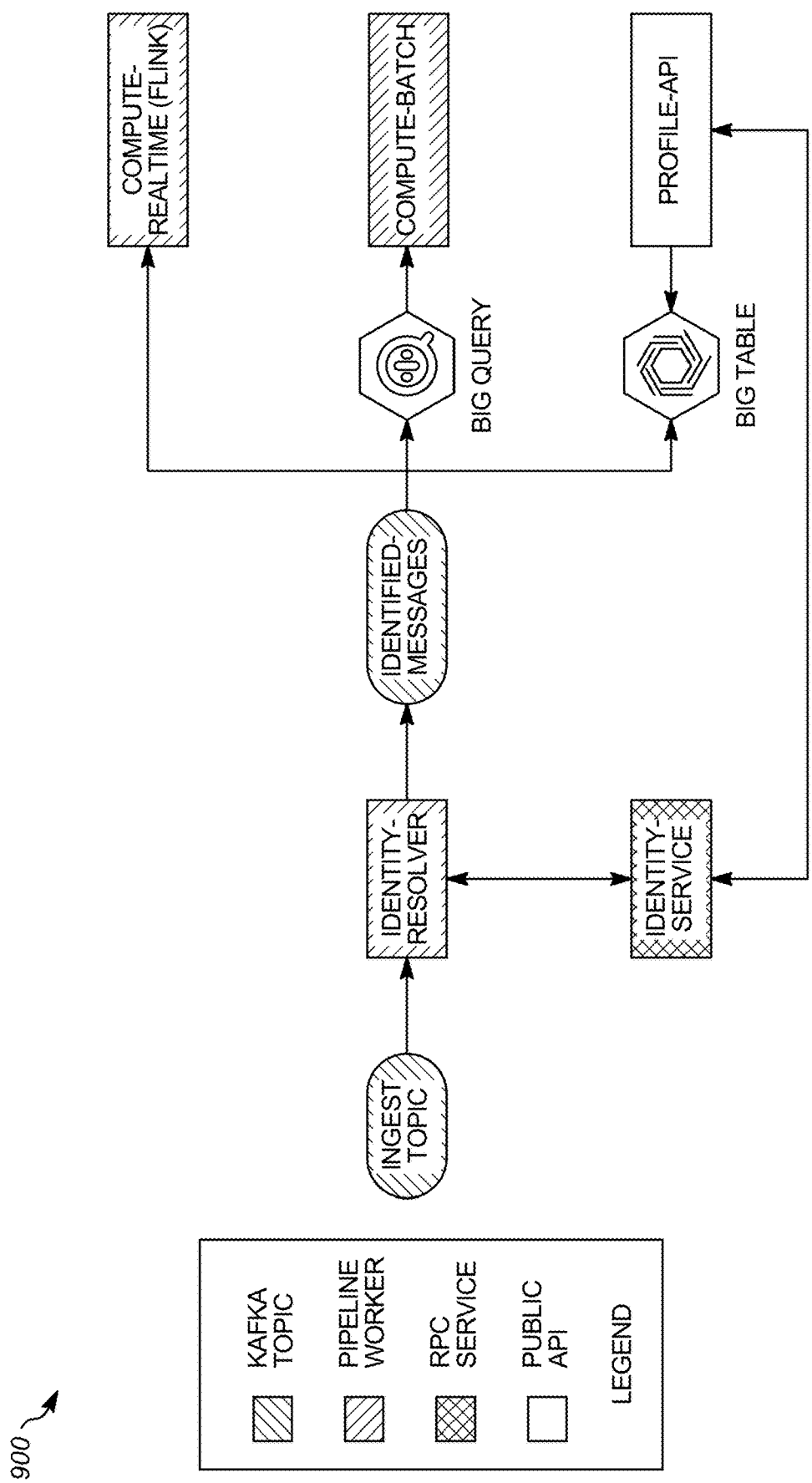
FIG. 9 depicts an example identity resolution pipeline.

FIG. 9 depicts logical data flow of the identity resolution pipeline. Here, the benefits of the approach of decoupling observation, storage, and the computation steps may be seen.

The identity resolution system first ingest data on a write API and records the observed Identity Fragments consisting of ExternalIDs (vertices) and their relationships (edges) (e.g., using a graph model).

The identity resolution then uses an API to perform a depth-first search to discover all connected identifiers and build a directed graph (e.g., ordered by time) of the previous observations.

The identity resolution system then applies rules or additional transforms to this graph (e.g., in a Copy-On-Write manner) to produce an entity profile.

In example embodiments, the identity resolution system provides two separate tiers: A Raw Identity Graph tier for recording Identity Fragments and a Computation tier for applying rules, transforms, or various algorithms to perform Identity Resolution and build entity profiles.

In example embodiments, messages from Spec calls (Identify, Track, etc.) will pass through an Identity Preprocessor service. In example embodiments, the identity resolution system simply hoist out ExternalIDs and any other applicable data that may be stored in the Raw Identity Graph. Additionally Blocked Values processing may exist in the Preprocessor, as well as new control mechanisms to block pathological cases or misbehaving sources. In example embodiments, the Identity Preprocessor produces its output to Kafka.

In example embodiments, a Raw Writer service will consume the output of the Identity Preprocessor and call a Write API service to record observations of Identity Fragments. Afterwards, the messages themselves and any accompanying metadata from the write call will then be sent (e.g., to a Kafka topic) to be consumed by the Resolver. Optionally, if we find we have a need for strict ordering guarantees, a Data Change Capture system may be employed to observe changes in the Raw Identity Graph DB and produce a time-ordered sequence of the modifications that were made to the database. This sequence may use an additional service to collect and store (e.g., in Kafka).

In either case, the stream of messages written to the Raw Identity Graph DB or the output of the Data Change Capture system may be stored (e.g., in Kafka) and may be consumed by the Crucible Resolver to trigger Profile Computation. This piece of decoupling will asynchronous triggering of Identity Resolution at any moment. For example, the identity resolution system may be configured to arbitrarily recompute Identity for any given External Identifier. For example, an administrative message may be inserted on the Event Stream topic, instructing the Profile Compute tier to do so.

The Resolver will call the Profile Compute system with information regarding the External Identifiers that have recently been observed and require Identity Resolution. The Profile Compute system will query the Graph API to retrieve an Identity Graph. Once that's retrieved, the compute tier may apply sets of rules, transforms, or algorithms, to resolve identity and create, modify, update, or delete entity profiles.

Figure 10:
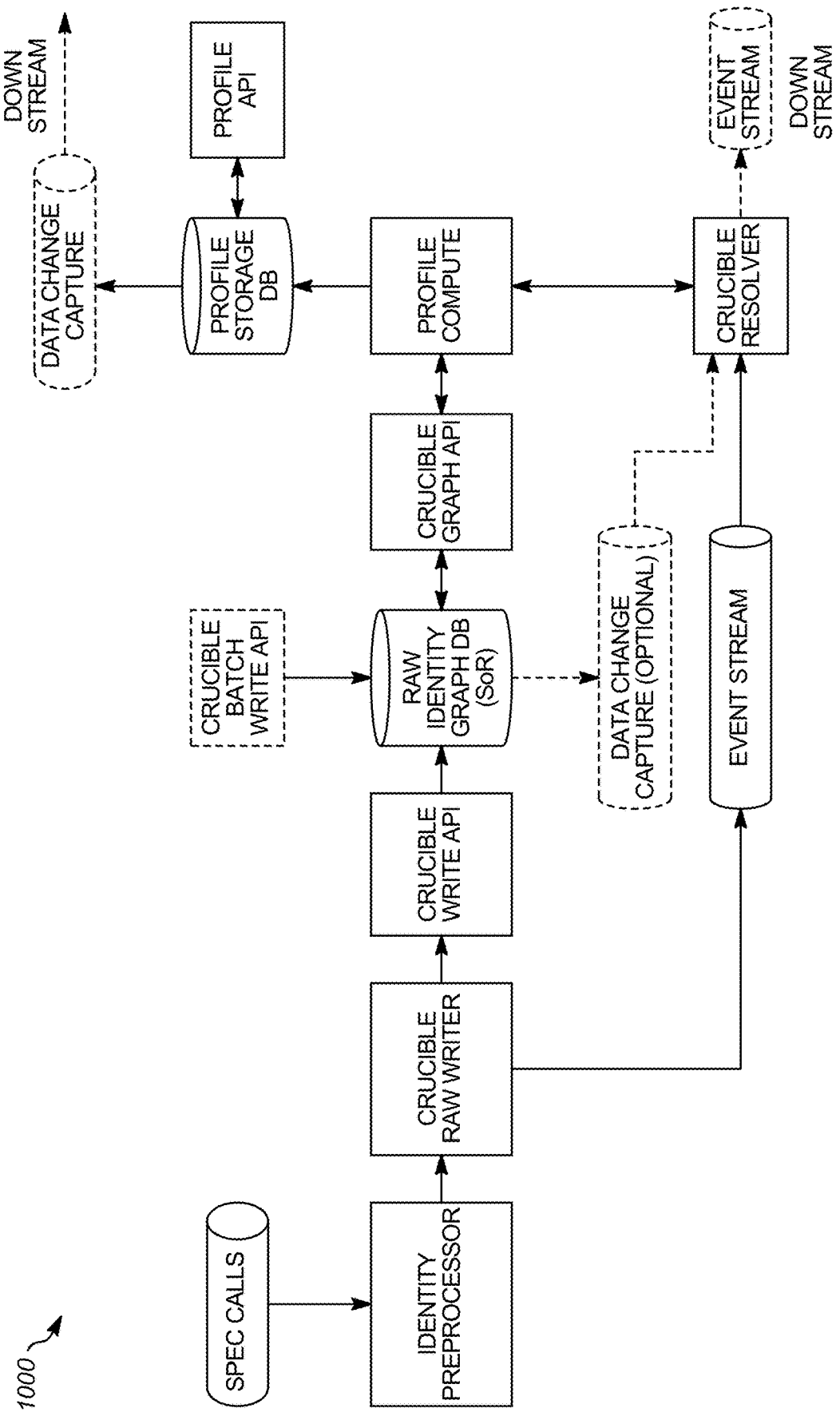
FIG. 10 depicts logical data flow of the identity resolution pipeline.

While FIG. 10 depicts a logical diagram, any of the one or more components may be something concrete, like a service, etc. Additionally certain components represent caches or systems like Kafka.

In example embodiments, a graph data model, such as a Property Graph or a Triple-Store model, may be used. These models may be implemented by a Graph database, such as Amazon's Neptune Graph DB. The various implementations may provide a flexible way to model objects and their relationships in a graph, but may use different terms and techniques to model data.

In example embodiments, a feature of the Raw Identity Graph is that neither the vertices or edges need to represent homogeneous data. For example, vertices and edges can be labeled (or typed) and can model many different Identity related observations in a graph.

Figure 11:
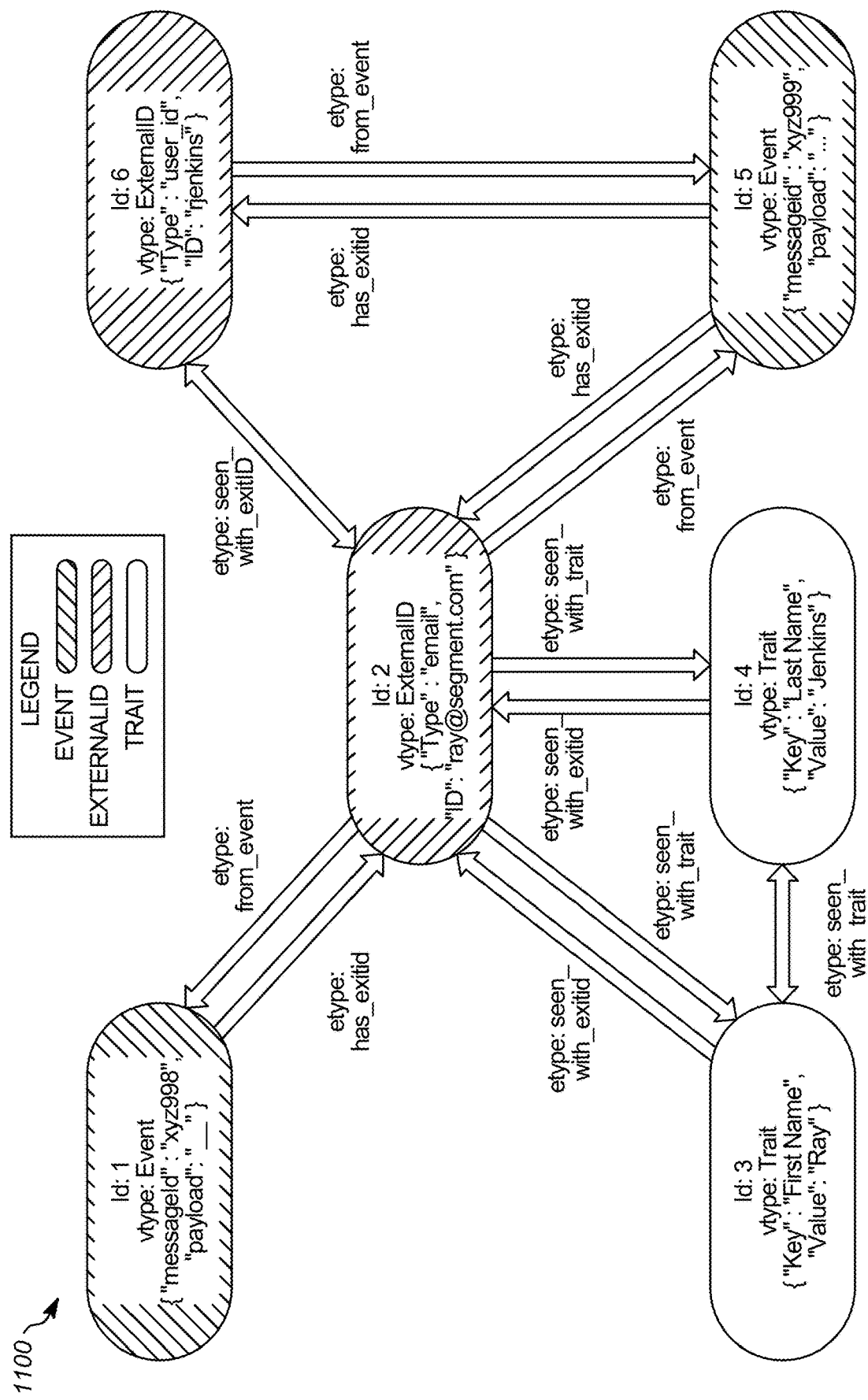
FIG. 11 depicts an example Property Graph of Identity including ExternalIDs, Traits, and Events.

FIG. 11 depicts an example Property Graph of Identity including ExternalIDs, Traits, and Events.

Objects are constructed with a type otype and contain a list of key/values pairs or properties. Associations are constructed with a type atype and a pair of source and destination object ids. Associations contain a list of key/values or properties, and also have an additional time attribute.

Object: (id)→otype, (key→value)*)
Assoc.: (id1, atype, id2)→(time, (key→value)*)

Once objects and associations are constructed a query can be generated to find associations between any set of objects.

An Example associations API may look like the following:

assoc_get(id1, atype, id2set, high, low)
assoc_count(id1, atype)
assoc_range(id1, atype, pos, limit)
assoc_time_range(id1, atype, high, low, limit)

A Property Graph model and API with the Identity Resolution graph is implemented to allow queries such as the following:

What are the 5 most recent traits, seen with Trait {"Key": "First Name", "Value": "Ray"}?
assoc_range(3, "seen_with_trait", 0, 5)
How many events was the ExternalID {"Type": "user_id", "ID": "rejenkins"} seen on?
assoc_count(6, "from_event")
What are all the ExternalIDs seen with ExternalID {"Type": "email", "ID": "ray@segment.com} in the past day?
assoc_time_range(2, "seen_with_extid", now ( ) now ( ) −86400,−1)

The graphs may be stored using a specialized graph storage technique, such as adjacency matrices or adjacency lists. Adjacency matrices generally have better time complexity but have a space complexity of $O(n2)$, where N is the number of vertices or $O(|V|2)$. Adjacency lists have somewhat better space complexity $O(n)$, where n is the sum of vertices and edges, also represented as O(|V|+|E|). However, in order to model many aspects of identity with a graph data model, the identity resolution system may quickly accumulate bi-directional edges between most vertices. The storage technique may be selected based on, for example one or more configurable thresholds for one or more of time complexity and/or space complexity.

In example embodiments, the Raw Identity Graph will store ExternalIDs. However, in example embodiments, whether the same graph stores additional data such as traits or events may be configurable.

In example embodiments, traits or events (e.g., received or discovered in the last 14 days), and other metadata associated with a unique user are stored in downstream systems, indexed by SegmentID. This flow supports the approach of resolving Identity at message ingest time and appending a SegmentID to each message. Downstream systems may then extract data such as traits and index via SegmentID.

In example embodiments, in example identity resolution system #1, an actual entity profile artifact is not materialized; instead, several systems may work in concert by utilizing a Surrogate Key (SegmentID) appended to messages to reconstruct certain aspects of identity at query time.

As an example, consider what happens when a user queries the Profile API wishing to find all traits for a unique user. They begin by issuing a query that looks like this:
curl https://profiles.segment.com/v1/spaces/<your-namespace-id>/collections/users/profiles/<your-segment-id>/external_id:val ue/traits This kicks off the following set of actions:

The Profile API contacts the identity resolution system; if the query contains an ExternalID (email: ray@segment.com), the identity resolution system finds the SegmentID associated with this ExternalID.

Once the identity resolution system has a SegmentID, it then finds all Merges, or other SegmentIDs associated with this SegmentID.

Next, the response with all SegmentIDs is sent back to the Profile API.

The Profile API then queries the Traits service for all the traits indexed to all the SegmentIDs.

Finally the Profile API flattens and returns the resulting traits using some ordering preference (e.g., Last Write Wins).

The example identity resolution system #2 may be configurable to use a similar approach as example identity resolution system #1 or to store some additional data, such as Traits, in the Raw Identity Graph. With the latter approach, processing of traits may be included in Identity Resolution logic as part of producing an entity profile artifact. This approach would likely reduce network calls and overall Profile API latency.

In example embodiments, the raw identity graph may be stored in a managed service database, such as Amazon's DynamoDB, which has theoretical infinite scalability and support for transactions with serializable isolation. In example embodiments, a managed service database may reduce costs and to prevent having to implement complex application logic to deal with replication lag that may exist in a non-managed service database. In example embodiments, using a managed service database would avoid limitations on the number of storage instances and processes (e.g., for a single cluster) and avoid maintenance, such as the need to shard the database.

In example embodiments, the Property Graph model is most useful when you are modeling heterogeneous data with Many-to-Many relationships. Therefore, the values for configuration options specifying what will be stored in the Raw Identity Graph will drive the data modeling approach. If the identity resolution system is configured to only store ExternalIDs, a flexible graph data model may be replaced with a data model that is optimized for this specific data set. As discussed above, a flexible data model will likely incur costs and trade-offs in space and time complexity.

Trade-offs in space and time complexity translate into IOPS, storage capacity, and compute cycles. For example, for a managed service database, such as DynamoDB, write capacity units (WCUs) may cost five times as much as read capacity units (RCUs). Therefore, if a managed service database is selected, the identity resolution system may be configured to reduce write capacity units (e.g., at the expense of some additional reads and potential latency) (e.g., via one or more configuration parameters.)

In example embodiments, operational data may be collected automatically by the identity resolution system to make estimates as to which data models and databases may be more efficient than others. Upon one or more configurable thresholds being transgressed, the identity resolution system may be configured to identify changes to the models or databases that would satisfy space and time constraints.

Additionally, the data models available to the identity resolution system may be dependent on the underlying database technology selected for use with the identity resolution system. The more specialized the database, the more restrictive the data model. As an example, here are three different options.

Build Your Own: On one of the spectrum we could implement our own storage engine specifically designed for efficient representation and querying of our data set. In this model we have to build everything ourselves and while the COGS savings could be substantial the upfront cost, potential for missteps, and time to market introduce significant risk. Succinct and ZipG present two potential approaches for building such a system in-house.

Off the shelf K/V Store: In the middle of the spectrum we could use a managed Key/Value store like DynamoDB and spend time building and refining our model for maximum COGS efficiency and performance. Depending on the complexity of the Computation tier we may spend significant time developing query capabilities.

Off the shelf Graph Database: On the far end of the spectrum, a managed Graph database, like Amazon Neptune, may be selected. With Neptune much less work would need to be done in terms of data modeling and building query support for the computation tier. For example, Neptune supports Gremlin and SPARQL graph query languages out of the box. However, graph databases are somewhat known for scalability limitations and performance deterioration as graphs become large. This means if Neptune is selected, the identity resolution system may need to be specially configured (e.g., using lots of engineering time for working around performance limitations or attempting to reduce costs).

Additionally, size limitations (64 TB) of a Neptune database means the identity resolution system would need to shard. Finally, COGS might make considering using a managed graph databases like Neptune out of the question, depending on COGS constraints.

Many-to-Many relationships may be modeled within Key/Value stores. For example, one such implementation would include adjacency lists for DynamoDB (e.g., that utilizes the Sort Key property to create an edge between two items).

However, as previously described, highly connected graphs can quickly approach a O(|V|2) storage complexity. As such, the identity storage system may be configurable to work with different data models in an attempt to reduce the storage requirements for the average use case.

In example embodiments, a managed database service backend for Janus Graph (formally Titan) may use an approach of creating a row for each vertex in the graph and storing each edge as a column-value entry. For nodes with multiple edges of the same type, the backend may utilize a super-column to store these edges. The usefulness of this approach may be limited by any max item size of the managed database service (e.g., such as a 400 KB max item size in DynamoDB).

Figure 12:
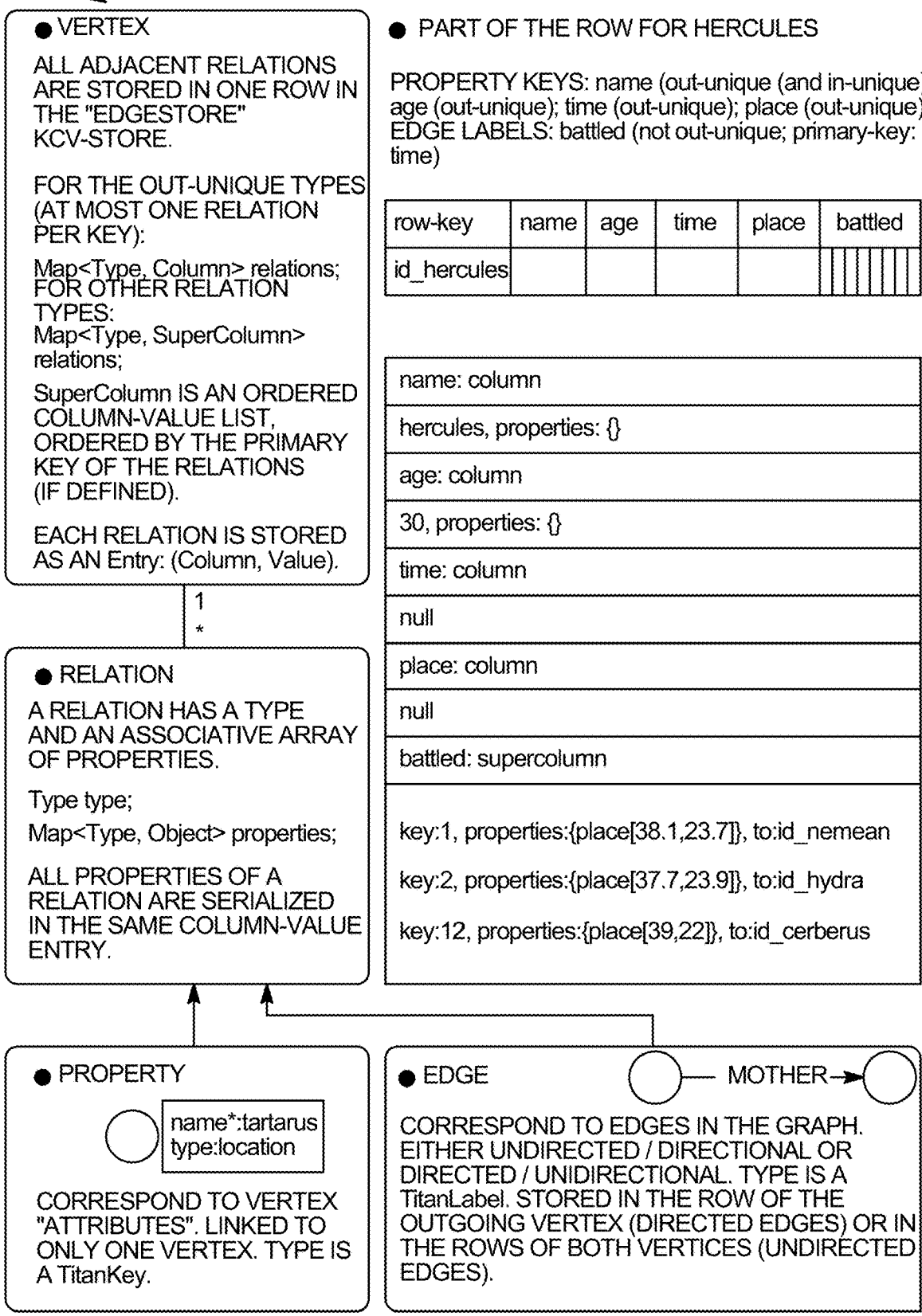
FIG. 12 depicts a Janus Graph DynamoDB backend data model.

FIG. 12 depicts a Janus Graph DynamoDB backend data model.

In example embodiments, the identity resolution system utilizes yet another approach in an attempt to reduce storage complexity. Though the identity resolution system may store vertices for example purposes, it may be configured to actually only rely on adjacency lists to model and discover graphs. Each adjacency may be stored as an Item consisting of a Left/Right pair with a unique Partition Key. In example embodiments, the identity resolution system may sort the External IDs within a message and then build a pair-wise set of adjacencies. Global secondary Indexes are created for the Left and Right ExternalID members of the key so they can be looked up independently. For example, if the identity resolution system were to receive the following four ExternalIDs, it would store the following three adjacencies:

{a,b,d,e}={a,b}, {b,d}{d,e}

However, this model can result in new adjacencies being created when new identifiers are found between existing adjacencies, when in sorted order:

{a,b,c,d}={b,c}{c,d}

FIG. 13 depicts a DynamoDB Adjacency example.

Finally, the identity resolution system may be configured to use a model referred to herein as the Identity Fragment Fingerprint. In this approach when the identity resolution system sees a new unique combination of External Identifiers, it inserts a set of items in one partition key computed as the hash of the Source Id+External Identifier set.

Additionally, the identity resolution system may insert one item per identifier {pk, ExternalID, timestamp, Source ID, indexValue=(Workspace ID, ExternalID)}. The identity resolution system may then create a Global secondary index on indexValue to allow lookup by (Workspace ID, ExternalID) that returns {pk, ExternalID}.

This approach results on insertion of N items, one item per ExternalID in the set, with subsequent N Global secondary index insertions.

This approach has a worst case space complexity of the sum of all combinations or:

Σn (n)
r=1 r where n is the total number of potentially observable identifiers in a set and r=1 ... n. For example, if the identity resolution system has a set of three ExternalIDs {a,b,c}. The total number of potential combinations is seven.

{a,b,c}={a}, {b}, {c}, {a,b}, {a,c}, {b,c}, {a,b,c}

FIG. 14 depicts a sketch of a DynamoDB Identity Fragment Fingerprint Model.

A purpose of the Event Stream/Data Change Capture system between the Raw Identity Graph DB and the Profile Compute system is to enable asynchronous identity resolution. The identity resolution system may be configured in one of at least to ways: either to generate its own stream of change notifications or use one of a managed database service's Stream APIs.

For example, some managed database services may support Data Change Capture through the use of Streams APIs. However, if the identity resolution system is configured to use Streams, it would likely need to be configured to utilize a low level API to read the change capture log and write these changes (e.g., to Kafka).

A reason to use a Streams API is when you want a global, time-ordered sequence of modifications to the database. Ordering of transactions is a critical requirement for Replication; without ordering it is impossible to keep replicas of data in-sync. In order to support ordering, the Streams API introduces some complexity. For example, change records in a stream are broken into shards. High write volumes can result in shards splitting into Parent and Child shards. In order to preserve ordering, the identity resolution system may need to be configured to track the state of shards and consume the shards in order of the parent/child hierarchy.

Figure 15A:
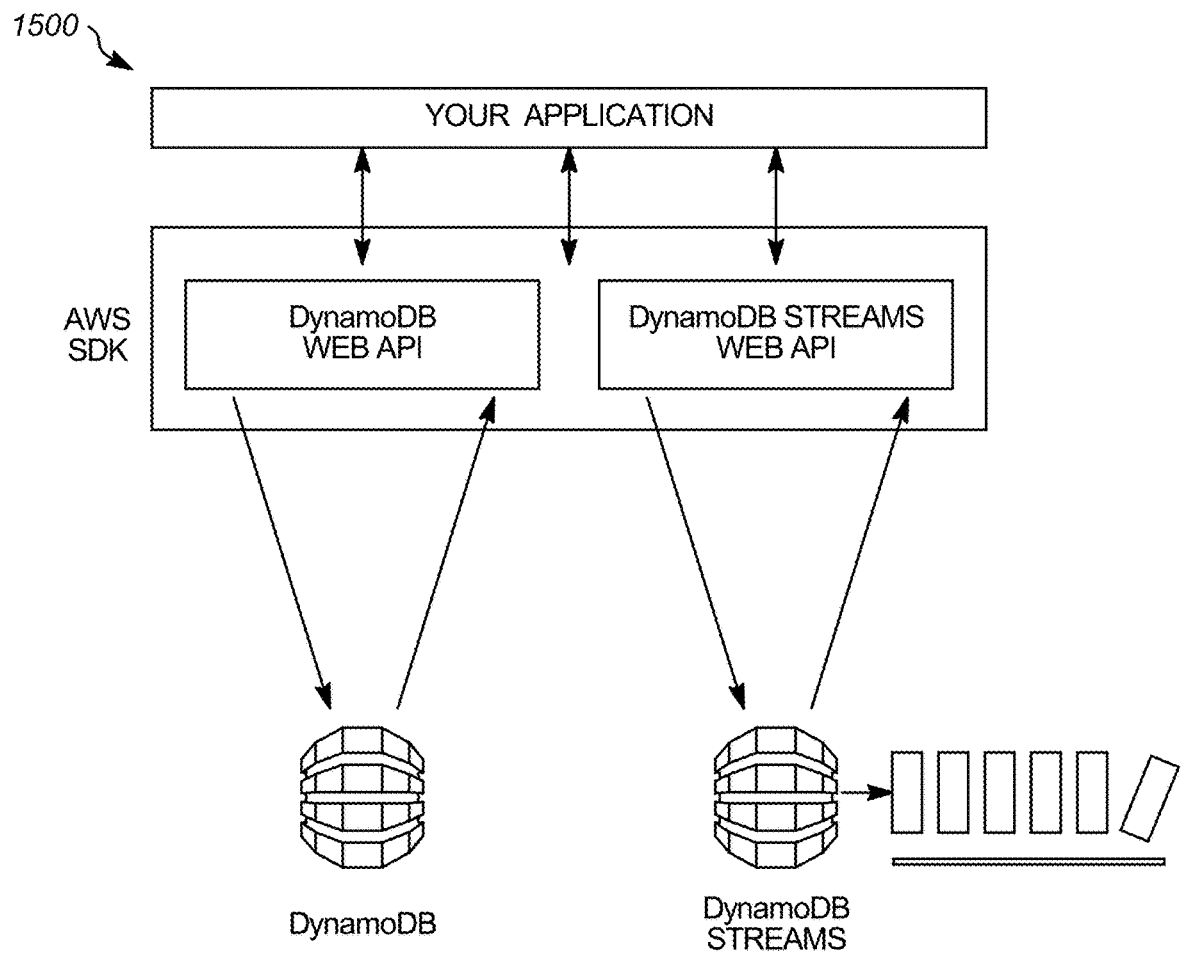
FIGS. 15A-15B depict DynamoDB streams and DynamoDB shard of Stream Records respectively.
Figure 15B:
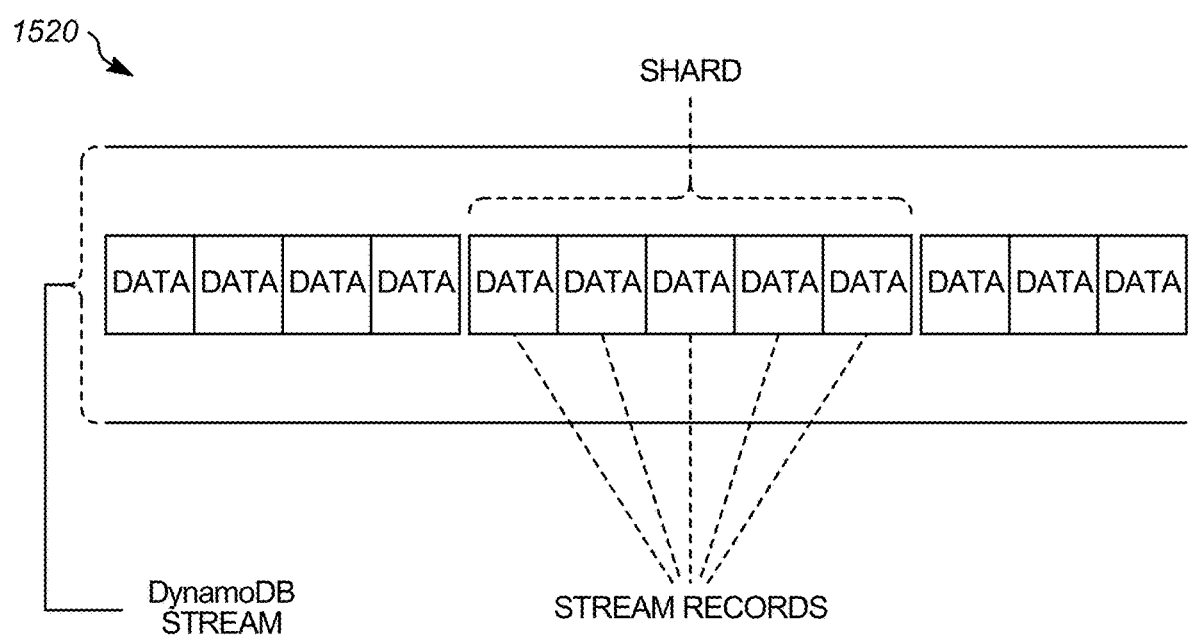

FIGS. 15A-15B depict DynamoDB streams and DynamoDB shard of Stream Records respectively.

In example embodiments, the identity resolution system may not need ordering guarantees provided by the Streams APIs, as it may not actually be replicating the data. Instead, the identity resolution system simply uses a change stream for notifying the Profile Compute tier to fetch the graph and perform Identity Resolution. Thus, in example embodiments, configuring the identity resolution system to not use the Streams API may reduce costs.

Therefore, in example embodiments, the identity resolution system may be configured to just send the event along to another topic which can be consumed by the Profile Compute tier. Additionally, the identity resolution system may be configured to enrich the event with additional data (e.g., potentially a SegmentID or other information after identity resolution has completed). Having both options available as configuration options will allow both options to be tried and settled on as a final solution.

In example embodiments, the capabilities of Profile Compute system may depend on the richness of the data stored in the Raw Identity Graph, the expressiveness of query languages and algorithms it employs, and its ability to integrate with other systems. In example embodiments, the Profile Compute tier encompasses many systems, each accomplishing different product requirements, rather than a single monolithic system for Identity Resolution.

The identity resolution system may employ one or more of several approaches at the Profile Compute tier. Once again, these are tied to the data model. One approach is to simply only work with External Identifiers, which is an approach suitable for example identity resolution system #1. As an alternative approach, the identity resolution system may incorporate more data than just External Identifiers in the Profile Compute system.

In example embodiments, example identity resolution system #2 demonstrates how existing Merge Protection rules can be implemented and enhanced using a graph data model. When the Profile Compute tier receives notification to recompute a Customer Profile for a set of External Identifiers, the Profile Compute system will query the Graph API to retrieve the Raw Identity Graph of all connected Identity Fragments for a given set of External Identifiers.

In this manner, rules may be applied after observations have been stored and may be modified continuously without applying side effects to previous observations. The following are a few examples. In example identity resolution #1, the oldest observations are considered more "trustworthy" than newer observations. In many ways this is counter intuitive; that is if we learn about new identifiers we may wish to prefer those over previous identifiers.

Figures 16, 17:
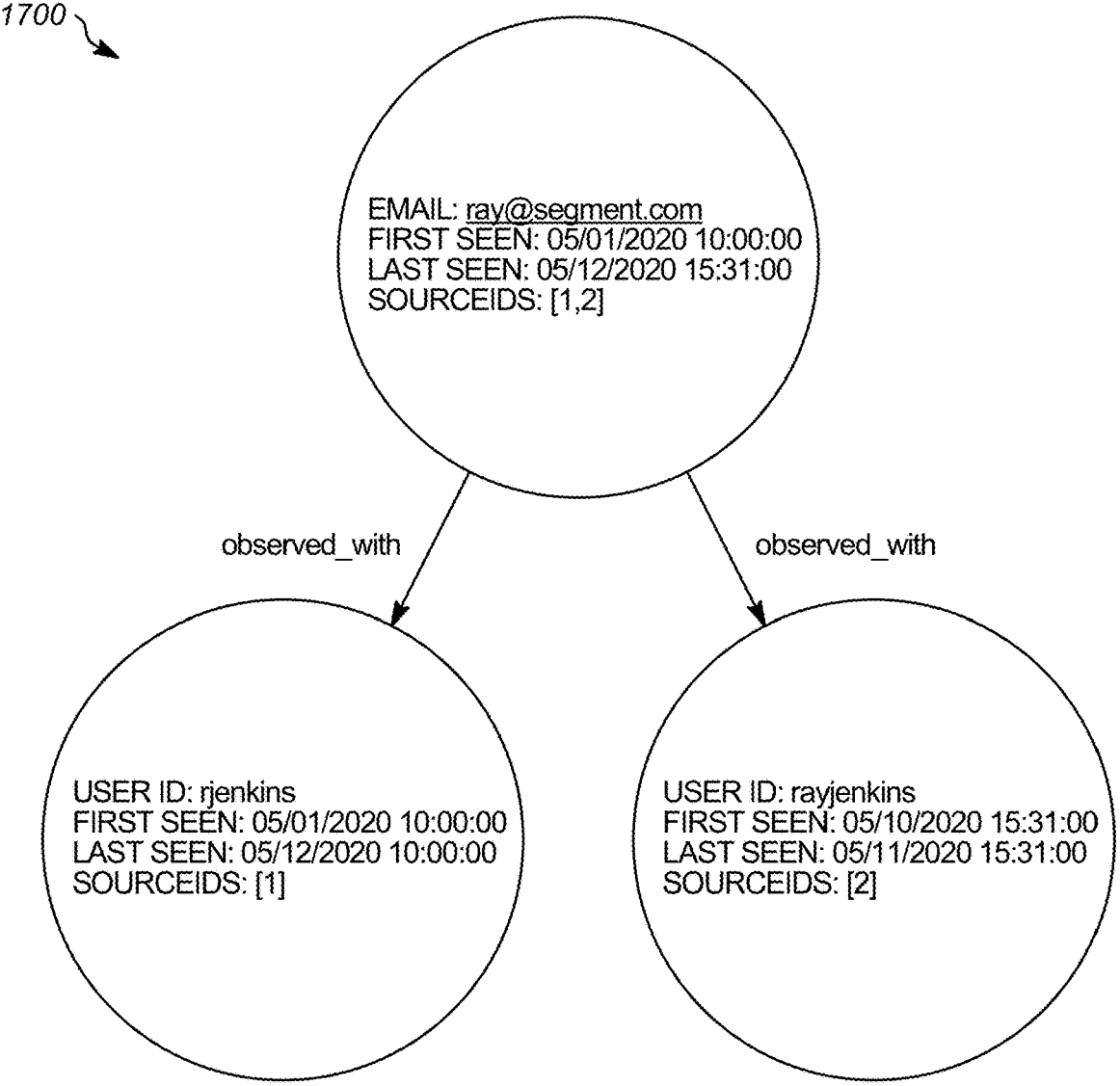
FIG. 16 depicts an example where a Merge Protection rule is configured in identity resolution system #1.
FIG. 17 depicts an example logical raw identity graph.

FIG. 16 depicts an example where a Merge Protection rule is configured in identity resolution system #1.

Here, if the identity resolution system has previously received a message with user_id rjenkins and later receives a message with user_d rayjenkins and email ray@segment.com, the identity resolution system will drop the email and create a new Customer Profile with user_id rayjenkins. However, this may not be what is wanted; thus, the identity resolution system should be configurable to upsert the newest user_id to the profile, or perhaps associate them both with the user.

When considering how to compute Identity with the data model used in example identity resolution system #1, the Graph API may return something that logically looks like the Logical Raw Identity Graph depicted in FIG. 15.

Using a set of rules supported by example identity resolution system #2, an Identity may be constructed that includes both User IDs or only a single User ID, but the identity resolution system may choose between the latest, newest, or by Source precedence (e.g., based on the rules or values of one or more configurable parameters).

FIG. 18 depicts an example API for getting external IDs with rules.

FIGS. 19-20 depict example results from calling the API of FIG. 16.

And of course, the rules may be changed at anytime to recompute identity from previous observations without impacting the graph of raw observations.

The Raw Identity Graph DB makes it possible for the identity resolution system to compute profiles in a non-destructive manner; therefore, the identity resolution system may allow independent development teams and end users to research new Identity Resolution techniques in parallel.

Example identity resolution system #2 demonstrates this flexibility through the use of configurable Graph Filter functions. The prototype approach could be expanded to allow copies of individual raw Identity Graphs to be passed to user defined functions (e.g., on AWS's Lambda)

Consider the following example. The Graph API of example identity resolution system #2 provides the capability to retrieve the entire raw identity graph of for an Entity when provided any single vertex within the graph. Additionally, the BuildDiGraph(extId ExtId) function supports building and returning the raw Identity Graph as a flattened, directed graph of ExternalID observations ordered by time.

FIG. 21 depicts an example of a depth-first search starting at an external ID.

Example identity resolution system #2 may then extend the BuildDigraph capabilities by introducing a new routine (e.g., called GetExternalIdsWithFilter(id ExtId, filter GraphFilter)). This function may wrap the BuildDigraph graph traversal algorithm and add the ability to execute custom functions while visiting nodes or edges within the graph.

FIG. 22 depicts an example of an API for executing custom functions.

As noted above, the Identity Resolution algorithm can be modeled as a function.

$f(G(V,E)) \rightarrow$ Customer Profile

The identity resolution system may slightly invert this by passing a function to the graph traversal algorithm; nonetheless, the result may be the same. The identity resolution system may support filtering Identifiers (e.g., by Source, by Time, or by Edges) to resolve Identity dynamically and produce a new set of External Identifiers for a Customer Profile.

Depending on the database, the identity resolution system may select graph traversal language capabilities without additional or significant development efforts. For example, Amazon's Neptune supports both Apache Tinkerpop's Gremlin Graph Traversal and SPARQL languages. However, for a managed database service, such as Amazon's DynamoDB, the identity resolution system may implement its own graph traversal and query capabilities.

In example embodiments, the identity resolution system may be configurable to expose graph query libraries to users. Allowing users to run arbitrary graph queries on a production, multi-tenant database, may not be feasible (based on system constraints). However, the identity resolution system may be configurable to use these languages (e.g., in AWS Lamba on in-memory copies of subgraphs) for users to perform Identity Resolution.

In example embodiments, the identity resolution system may be configured to include any key/value pair of properties, not just External Identifiers, in its construction of an entity profile.

Key/Values pairs may be selected from a stream of data, filtered, aggregated, transformed and then ultimately upserted directly onto entity profiles. In example embodiments, a query may be made to select and insert various fields and counters, including age, last visit timestamp, amount of first order, and various traits (or user attributes) directly onto an entity profile.

In example embodiments, to modify a Customer Profile programmatically, a new Computed Trait can be defined. As events are fed through the system, Identity is resolved and appended to each event, and then downstream trait computation systems consume the events and calculate the new computed attributes. Once new traits are computed, new events are generated and are fed back into the tracking-api to be routed back through the pipeline. Ultimately these events with the new computed traits end up being fed to BigTable, and are indexed by Segment ID.

In example embodiments, capabilities such as Computed Traits are used with the Profile Compute system, providing another example of different artifacts that may be produced at the Profile Compute tier.

Figure 23:
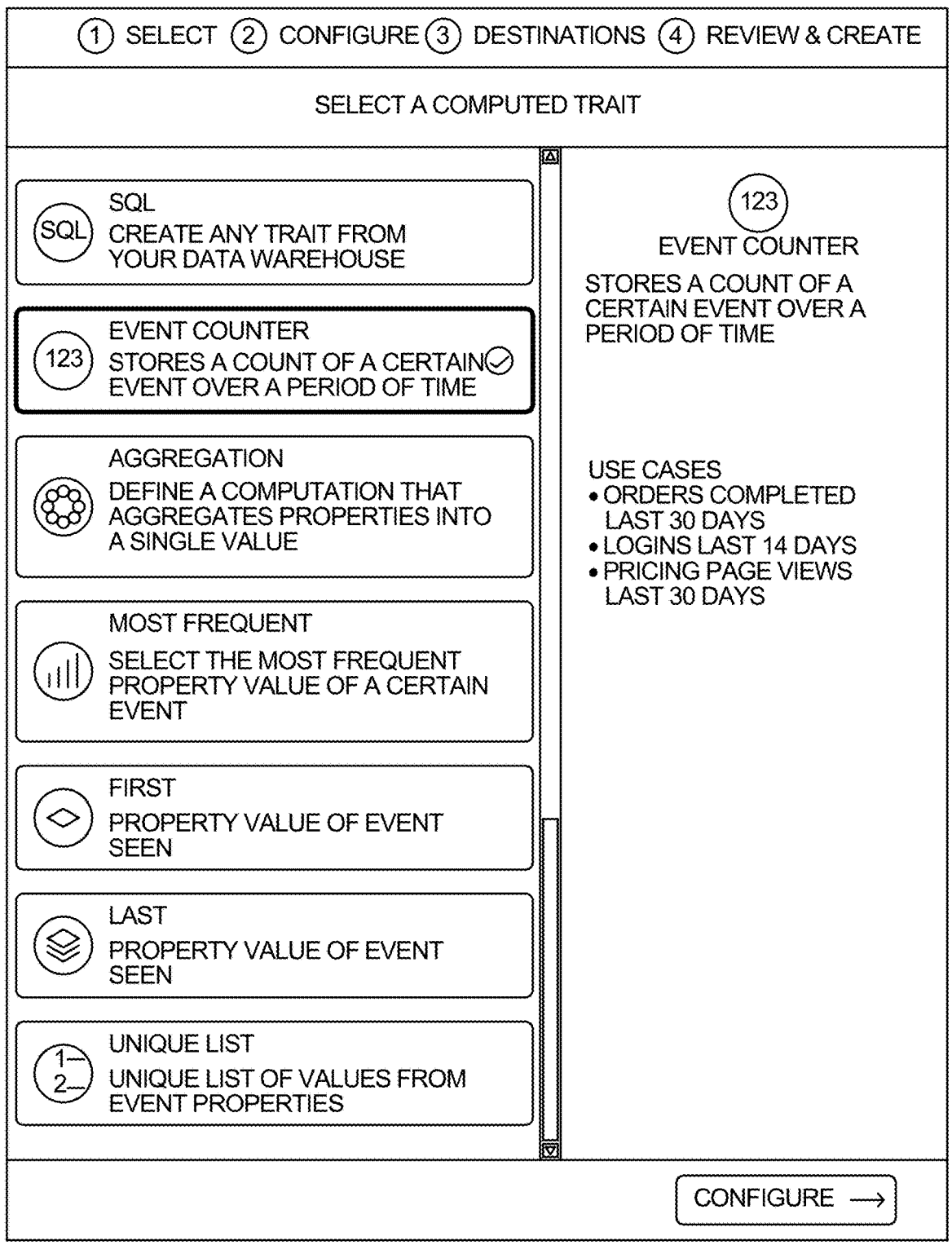
FIG. 23 depicts an example user interface including a Computed Traits View.

FIG. 23 depicts an example user interface including a Computed Traits View.

FIG. 24 depicts an example user interface including a Computed Trait as a top level concept.

FIG. 25 depicts an example user interface including a Computed Trait Detail View and Matching Users.

FIG. 26 depicts an example user interface including a Computed Trait Viewed on a Customer Profile.

In example embodiments, there is no single artifact or repository for a Customer Profile. Customer Profiles are the intersection of External Identifiers and their mappings to Segment IDs, the indexing of traits to SegmentIDs, the indexing of Events by SegmentID, Merges between Segment IDs, and the flattening of traits and events when merges occur between Segment IDs.

In example embodiments, any arbitrary data can be extracted, transformed, and appended to Customer Profiles. For example, if we wish to track Orders Completed by User, that can be defined in a query and appended directly to a Customer Profile. In example embodiments, an actual Customer Profile (e.g., a JSON document) may be created.

In example embodiments, profiles may be unmerged at the Profile Compute tier. Alternatively, it may be implemented through receiving unmerge messages on the write path, rather than a bit of logic at the compute tier. Allowing the Profile Compute tier to modify the Raw Identity Graph DB could introduce data corruption issues.

FIG. 27 depicts an example graph for which the identity resolution system determines to remove an observation between ExternalIDs A and B.

Though this would be possible at the compute tier, it may be risky to properly anchor this logic without corrupting other graphs. If the unmerging is very specific between a small handful of External IDs, the risk is lower; however, it may be simpler to trigger unmerge on ingestion of an event on the write path. In example embodiments, the identity resolution system may be configured to piggyback on an existing call like Identify or add a new call, perhaps UnIdentify. Alternatively, the identity resolution system may be configured to piggyback on a Track call with a sentinel event attribute of __unmerge__.

---

{ "type" : "__unmerge__", "id1" : { "Type" : "email", "ID" : "A" }, "id2" : {"Type" : "anonymousId", "ID" : "B" }}

---

When received on the write path, the identity resolution system would search the graph for this association and delete the Edge in the database. The identity resolution system would then insert two new messages, each with one of the External Identifiers into the Change Capture system. These messages would notify the compute tier to completely recompute Identity for these two identifiers.

In example embodiments, deleting individual nodes in the graphs is supported as well. However, this may result in additional potential orphans if the node is not a leaf. Protection mechanisms may be required to detect these cases and notify of the potential loss of data before applying.

If events are enriched with Identity data then Identity resolution ideally sits early in the pipeline. Onebox, however has flattened several microservices into a single in-memory pipeline. At the very least, nothing should come before Inbound Normalizer. Given this, the identity resolution system may be configurable to either sit after Dedupe or break out a Kafka topic for Inbound Normalizer in Onebox.

Merge protection rules can result in side effects; for example, additional profiles being created when a limit is reached and identifiers are dropped. In example embodiments, additional identifiers are added to the graph regardless of limits and are later potentially filtered out at profile computation time.

When receiving an event, the Profile Compute tier may be configured to fetch the Raw Identity Graph and resolve Identity to a set of External Identifiers using rules or other techniques described above. The example identity resolution system #2 can then query materialized mappings of External IDs from a Customer Profile DB and follow the existing pattern described with respect to identity resolution system #1: Create New Profile, Add Event to Existing Profile, or Merge Existing Profiles. With this pattern, the example identity resolution system #2 may be configured to enrich the Event with the SegmentID and any additional merge information.

One benefits of using surrogate keys (SegmentIDs) are that they reduce the number of indexes needed to reference attributes of a profile. Additionally, for systems like Audience computation, SegmentIDs can be used as a key to identify and aggregate event counts for unique users within an audience. However surrogate keys introduce complications. Essentially, they capture Identity at a distinct period of time for an Event. As such, the identity resolution system may be configured to maintain the entire history of these SegmentIDs and their merges for the entire life cycle of the Customer Profile.

If systems like Audiences can simply track messages that match a set of criteria (e.g., Order Completed), they may be able to defer the Identity Resolution step until producing a result. Another approach may be for them to subscribe to a data change capture stream which reports changes to the External Identifiers associated with a given SegmentID.

In example embodiments, events received at the Tracking API with External Identifiers can be considered immutable. In an Identity resolution system that is capable of flexibly modifying which External Identifiers are associated with which Customer Profiles keeping the External ID to Surrogate Key mapping inside the Identity Resolution system may be beneficial.

In example embodiments, different data models will allow for different levels of run time safety mechanisms. For example, merge protection rules were originally created in attempts to stop customers from creating extremely large, pathological graphs. For property graphs it may be easier to calculate the number of edges at write time to detect nodes with high fan-in (merge carnality) or graphs with depth problems. For other data models such as the Identity Fragment Fingerprint this could be done via walking the graph on some sample of writes or during profile compute. Either way, the identity resolution system may be configured to inspect graphs quickly and detect pathological cases. In example embodiments, a feedback mechanism is used to block writes on specific sources with specific External Identifiers.

A common pattern customers implement may be sending an Identify call with an anonymous_id whenever a user lands on a page. Later when they log in customers will send an Identify call that includes a Known User External Identifier (e.g., user_id and the anonymous_id). However, due to a merge limit (e.g., of 100), the identity resolution server may never connect these Fragments. Therefore, the identity resolution system may be configured to only track anonymous to known user behavior for a user's first number interactions under the merge limit.

After the merge limit has been hit any messages that would result in merges on a Customer Profile may be dropped. This can additionally result in data loss due to failing to process messages. These dropped messages may include traits or additional information useful for enriching Customer Profiles with Computed Traits. In example embodiments, the identity resolution system is configurable such that the existence of these dropped messages does not preclude tracking new anonymous to known user behavior.

Another issue related to anonymous user tracking is Orphans. Some non insignificant part of the identity resolution systems' storage capacity may be used by orphaned External Identifiers and User mappings. New shorter time limits on cookies in browsers means more turn over in anonymous_ids. If anonymous_ids are not merged with a Known User External Identifier, they essentially will become orphaned in the Identity Resolution database.

In example embodiments, the identity resolution system includes mechanisms to coalesce data from anonymous identifiers which have been merged with a Customer Profile while pruning them from the graph and merge history. In example embodiments, the identity resolution system is configured to discover and cleanup orphaned anonymous users which will never merge with known user profiles.

Figure 28:
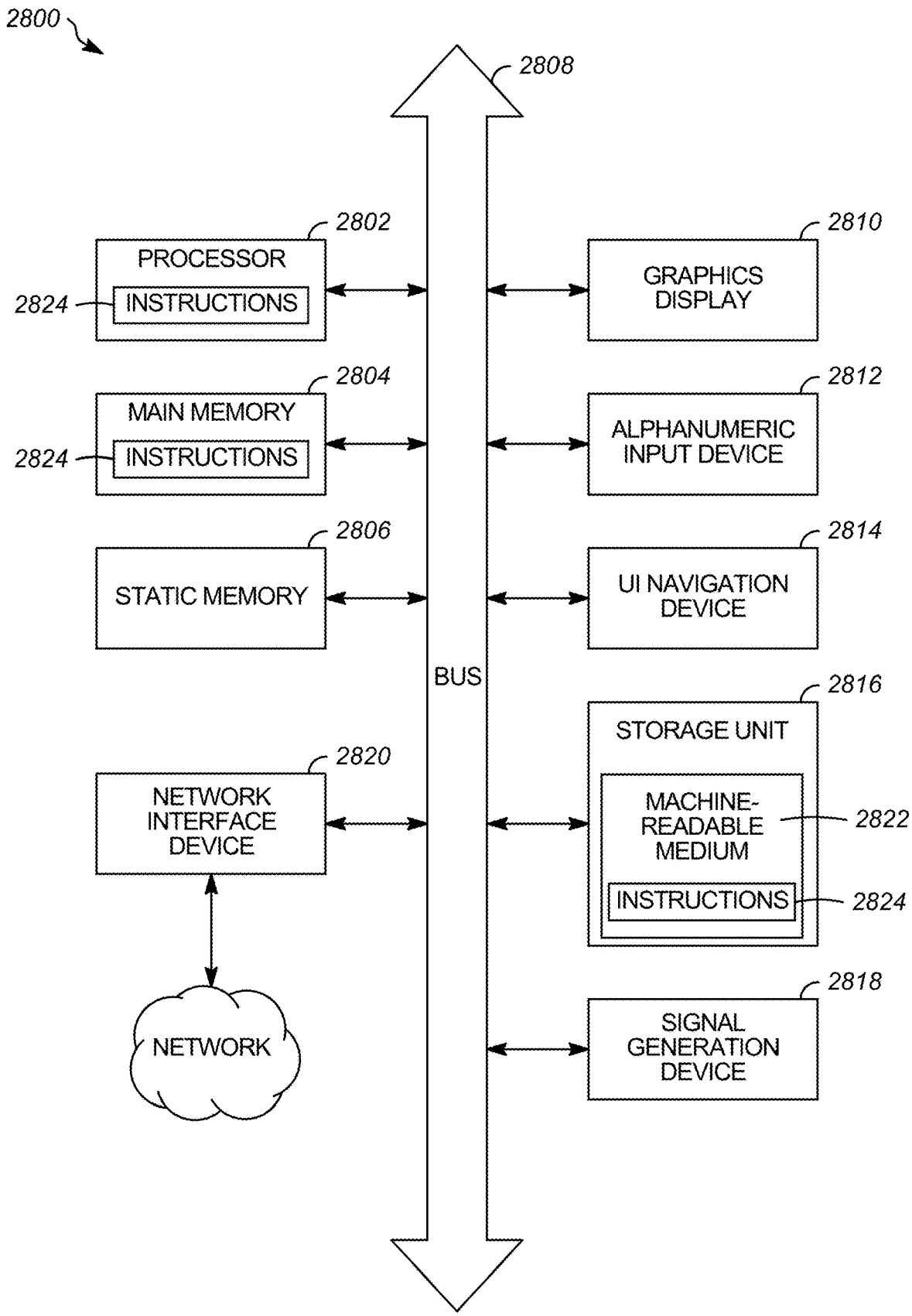
FIG. 28 is a block diagram illustrating an example of a machine upon or by which one or more example process embodiments described herein may be implemented or controlled.

FIG. 28 is a block diagram illustrating an example of a machine 1700 upon or by which one or more example process embodiments described herein may be implemented or controlled. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in a peer-to-peer (P2P) (or other distributed) network environment. Further, while only a single machine 1700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2800 may include a hardware processor 2802 (e.g., a central processing unit (CPU), a hardware processor core, or any combination thereof), a graphics processing unit (GPU) 2803, a main memory 2804, and a static memory 2806, some or all of which may communicate with each other via an interlink (e.g., bus) 2808. The machine 2800 may further include a display device 2810, an alphanumeric input device 2812 (e.g., a keyboard), and a user interface (UI) navigation device 2814 (e.g., a mouse). In an example, the display device 2810, alphanumeric input device 2812, and UI navigation device 2814 may be a touch screen display. The machine 2800 may additionally include a mass storage device (e.g., drive unit) 2816, a signal generation device 2818 (e.g., a speaker), a network interface device 2820, and one or more sensors 2821, such as a Global Positioning System (GPS) sensor, compass, accelerometer, or another sensor. The machine 2800 may include an output controller 2828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 2815 may include a machine-readable medium 2822 on which is stored one or more sets of data structures or instructions 2824 (e.g., software) embodying or utilized by any one or more of the techniques or functions described herein. The instructions 2824 may also reside, completely or at least partially, within the main memory 2804, within the static memory 2806, within the hardware processor 2802, or within the GPU 2803 during execution thereof by the machine 2800. In an example, one or any combination of the hardware processor 2802, the GPU 2803, the main memory 2804, the static memory 2806, or the mass storage device 2816 may constitute machine-readable media.

While the machine-readable medium 2822 is illustrated as a single medium, the term "machine-readable medium" may include a single medium, or multiple media, (e.g., a centralized or distributed database, and/or associated caches and servers) configured to store the one or more instructions 2824.

The term "machine-readable medium" may include any medium that is capable of storing, encoding, or carrying instructions 2824 for execution by the machine 2800 and that cause the machine 2800 to perform any one or more of the techniques of the present disclosure, or that is capable of storing, encoding, or carrying data structures used by or associated with such instructions 2824. Non-limiting machine-readable medium examples may include solid-state memories, and optical and magnetic media. In an example, a massed machine-readable medium comprises a machine-readable medium 2822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2824 may further be transmitted or received over a communications network 2826 using a transmission medium via the network interface device 2820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer memories;
   one or more computer processors;
   a set of instructions incorporated into the one or more computer memories, the set of instructions configuring the one or more computer processors to perform operations, the operations comprising:
   recording, by the system, identity fragments observed in entity data ingested from one or more data sources, each of the identity fragments representing partial information about an identity of an entity;
   building, by the system, a directed graph of identity fragments to model one or more relationships between the identity fragments; and
   producing by the system, an entity profile by applying a set of rules to the directed graph, the set of rules specifying one or more criteria pertaining to merging of the identity fragments in the entity profile.

2. The system of claim 1, the operations further comprising discovering one or more identifiers that are connected across the identity fragments.

3. The system of claim 1, wherein the directed graph is ordered by time.

4. The system of claim 1, wherein the applying of the set of rules is performed in a copy-on-write manner.

5. The system of claim 1, wherein the identity fragments include one or more vertices and one or more edges, the one or more vertices corresponding to one or more external identifiers, the one or more edges representing one or more relationships between the one or more vertices.

6. The system of claim 1, the operations further comprising sending at least some of the entity profile as identification data to one or more destination machines.

7. The system of claim 6, wherein the identification data is resolved into one or more external identifiers compatible with one or more destination applications executing on the one or more destination machines.

8. A method comprising:
   recording, by a server system, identity fragments observed in entity data ingested from one or more data sources, each of the identity fragments representing partial information about an identity of an entity;
   building, by the server system, a directed graph of identity fragments to model one or more relationships between the identity fragments; and
   producing, by the server system, an entity profile by applying a set of rules to the directed graph, the set of rules specifying one or more criteria pertaining to merging of the identity fragments in the entity profile.

9. The method of claim 8, further comprising discovering one or more identifiers that are connected across the identity fragments.

10. The method of claim 8, wherein the directed graph is ordered by time.

11. The method of claim 8, wherein the applying of the set of rules is performed in a copy-on-write manner.

12. The method of claim 8, wherein the identity fragments include one or more vertices and one or more edges, the one or more vertices corresponding to one or more external identifiers, the one or more edges representing one or more relationships between the one or more vertices.

13. The method of claim 8, further comprising sending at least some of the entity profile as identification data to one or more destination machines.

14. The method of claim 13, wherein the identification data is resolved into one or more external identifiers compatible with one or more destination applications executing on the one or more destination machines.

15. A non-transitory computer-readable storage medium storing a set of instructions that, when executed by one or more computer processors, causes the one or more computer processors to perform operations, the operations comprising:
   recording identity fragments observed in entity data ingested from one or more data sources, each of the identity fragments representing partial information about an identity of an entity;
   building a directed graph of identity fragments to model one or more relationships between the identity fragments; and
   producing an entity profile by applying a set of rules to the directed graph, the set of rules specifying one or more criteria pertaining to merging of the identity fragments in the entity profile.

16. The non-transitory computer-readable storage medium of claim 15, the operations further comprising discovering one or more identifiers that are connected across the identity fragments.

17. The non-transitory computer-readable storage medium of claim 15, wherein the directed graph is ordered by time.

18. The non-transitory computer-readable storage medium of claim 15, wherein the applying of the set of rules is performed in a copy-on-write manner.

19. The non-transitory computer-readable storage medium of claim 15, wherein the identity fragments include one or more vertices and one or more edges, the one or more vertices corresponding to one or more external identifiers, the one or more edges representing one or more relationships between the one or more vertices.

20. The non-transitory computer-readable storage medium of claim 15, further comprising sending at least some of the entity profile as identification data to one or more destination machines.

* * * * *